United States Patent
Sato

(10) Patent No.: US 11,215,099 B2
(45) Date of Patent: Jan. 4, 2022

(54) EXHAUST GAS CONTROL APPARATUS FOR INTERNAL COMBUSTION ENGINE

(71) Applicant: TOYOTA JIDOSHA KABUSHIKI KAISHA, Aichi-ken (JP)

(72) Inventor: Masaaki Sato, Susono (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 16/839,076

(22) Filed: Apr. 3, 2020

(65) Prior Publication Data

US 2020/0340380 A1 Oct. 29, 2020

(30) Foreign Application Priority Data

Apr. 25, 2019 (JP) .............................. JP2019-084703

(51) Int. Cl.
*F01N 3/20* (2006.01)
*F01N 9/00* (2006.01)
*F01N 11/00* (2006.01)

(52) U.S. Cl.
CPC ........... *F01N 3/208* (2013.01); *F01N 3/2066* (2013.01); *F01N 9/00* (2013.01); *F01N 11/00* (2013.01); *F01N 2610/02* (2013.01); *F01N 2610/10* (2013.01); *F01N 2900/1404* (2013.01);
(Continued)

(58) Field of Classification Search
CPC . F01N 3/208; F01N 11/00; F01N 9/00; F01N 3/2066; F01N 2900/1622; F01N 2900/1811; F01N 2610/02; F01N 2610/10; F01N 2900/1404; F01N 2240/16; F01N 2560/06; F01N 11/002; F01N 3/2006;
(Continued)

(56) References Cited

U.S. PATENT DOCUMENTS

2013/0255235 A1 10/2013 Hodgson et al.
2016/0250592 A1* 9/2016 Yoshikawa ........... F01N 3/2066 422/111
2016/0281567 A1 9/2016 Ota
(Continued)

FOREIGN PATENT DOCUMENTS

CN 102844534 A 12/2012
CN 109098825 A 12/2018
(Continued)

*Primary Examiner* — Brandon D Lee
(74) *Attorney, Agent, or Firm* — Hauptman Ham, LLP

(57) ABSTRACT

An exhaust gas control apparatus includes an SCR catalyst arranged in an exhaust passage, a heating device that heats the SCR catalyst, a urea solution supply device that supplies a urea solution to an upstream side of the SCR catalyst, a controller that operates the heating device and the urea solution supply device, and at least one sensor that acquires information related to a state of the exhaust gas control apparatus. The controller executes a state determination process for determining whether the exhaust gas control apparatus is currently in a predetermined state in which ammonia is not adsorbable on the SCR catalyst based on the information from the at least one sensor, and a heating avoidance process for avoiding heating the SCR catalyst with the heating device irrespective of an operating condition of the internal combustion engine when the exhaust gas control apparatus is currently in the predetermined state.

12 Claims, 15 Drawing Sheets

(52) U.S. Cl.
CPC ............... *F01N 2900/1622* (2013.01); *F01N 2900/1811* (2013.01)

(58) Field of Classification Search
CPC .... F01N 3/2013; F01N 3/0814; F01N 3/0842; F01N 3/20; Y02T 10/12; Y02T 10/40
See application file for complete search history.

(56) References Cited

U.S. PATENT DOCUMENTS

| | | | |
|---|---|---|---|
| 2017/0328263 A1* | 11/2017 | Uhrich | F01P 3/20 |
| 2017/0350292 A1* | 12/2017 | Tomita | F01N 13/0097 |
| 2019/0155230 A1* | 5/2019 | Culbertson | G07C 5/0808 |
| 2019/0271247 A1 | 9/2019 | Minezawa et al. | |
| 2020/0003098 A1* | 1/2020 | Okajima | F01N 3/208 |

FOREIGN PATENT DOCUMENTS

| | | |
|---|---|---|
| EP | 3103978 A1 | 12/2016 |
| JP | 6045034 B2 | 12/2016 |
| JP | 2018-71362 A | 5/2018 |
| JP | 2018128006 A | 8/2018 |

\* cited by examiner

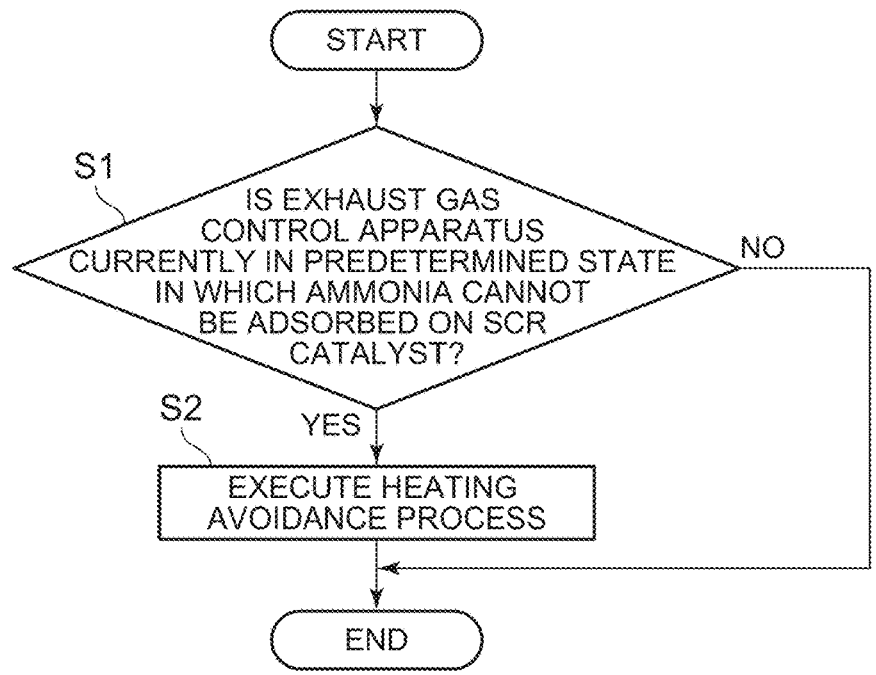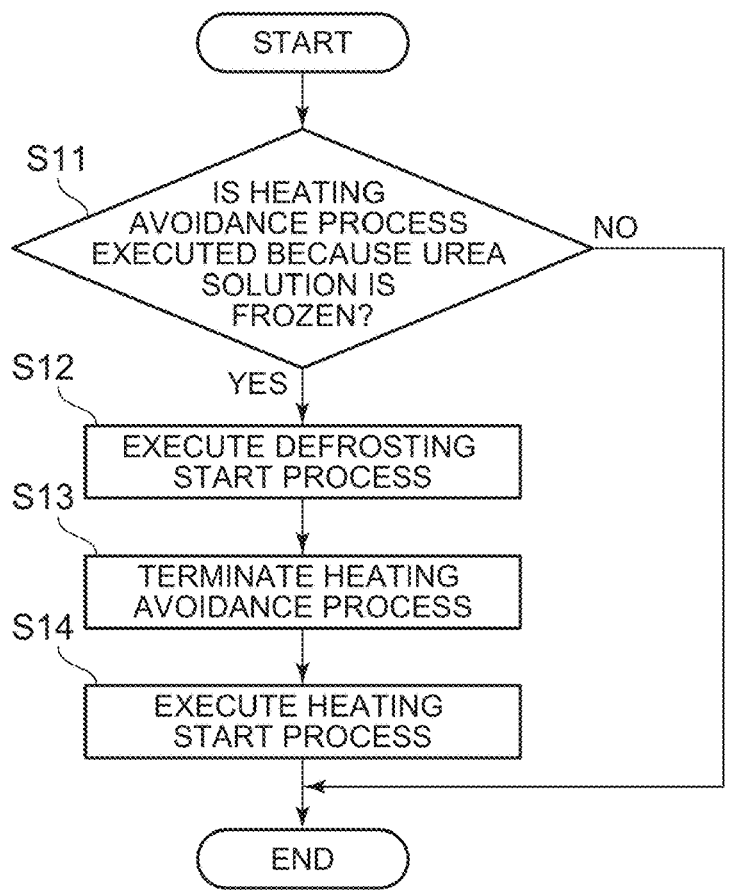

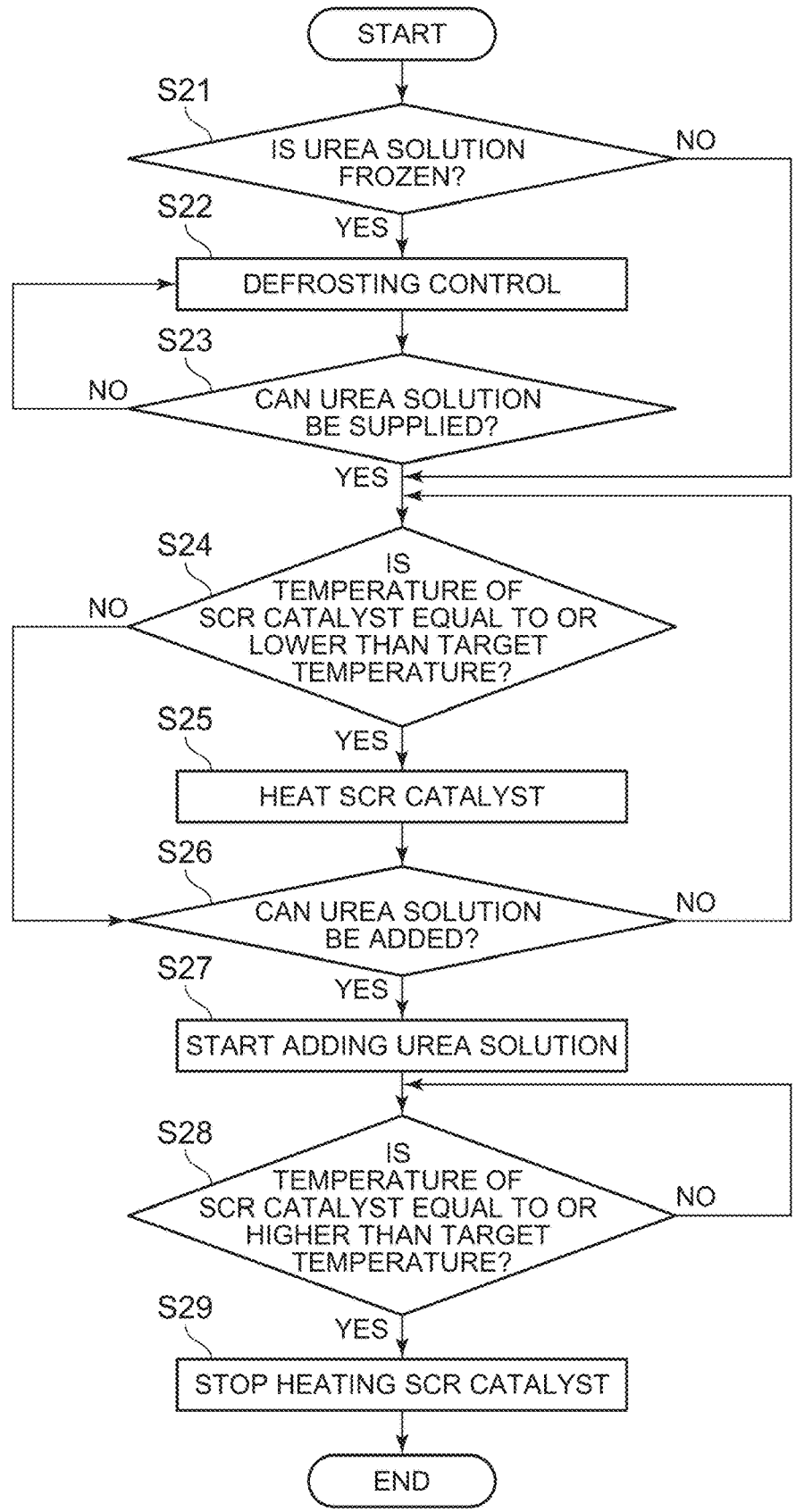

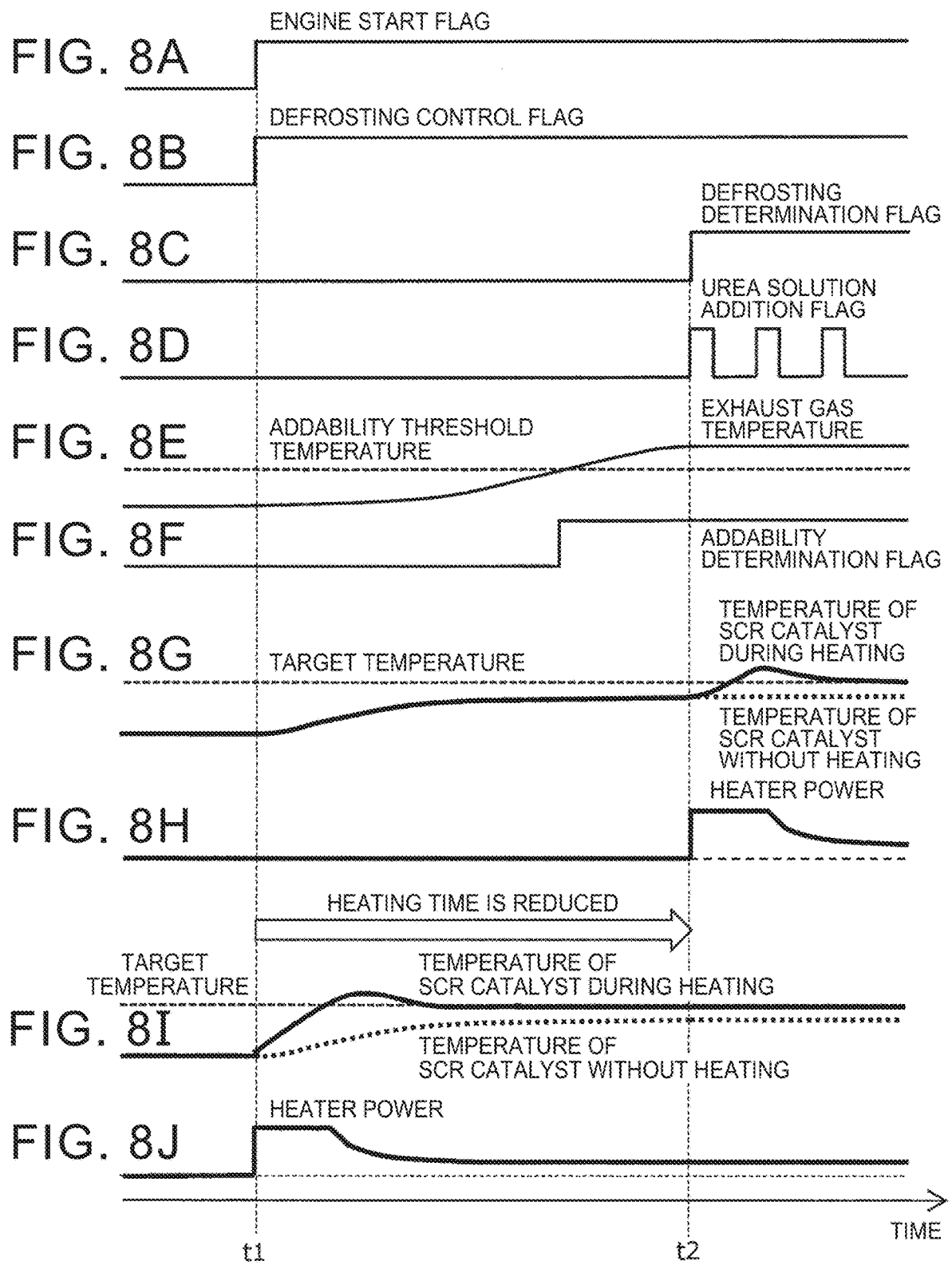

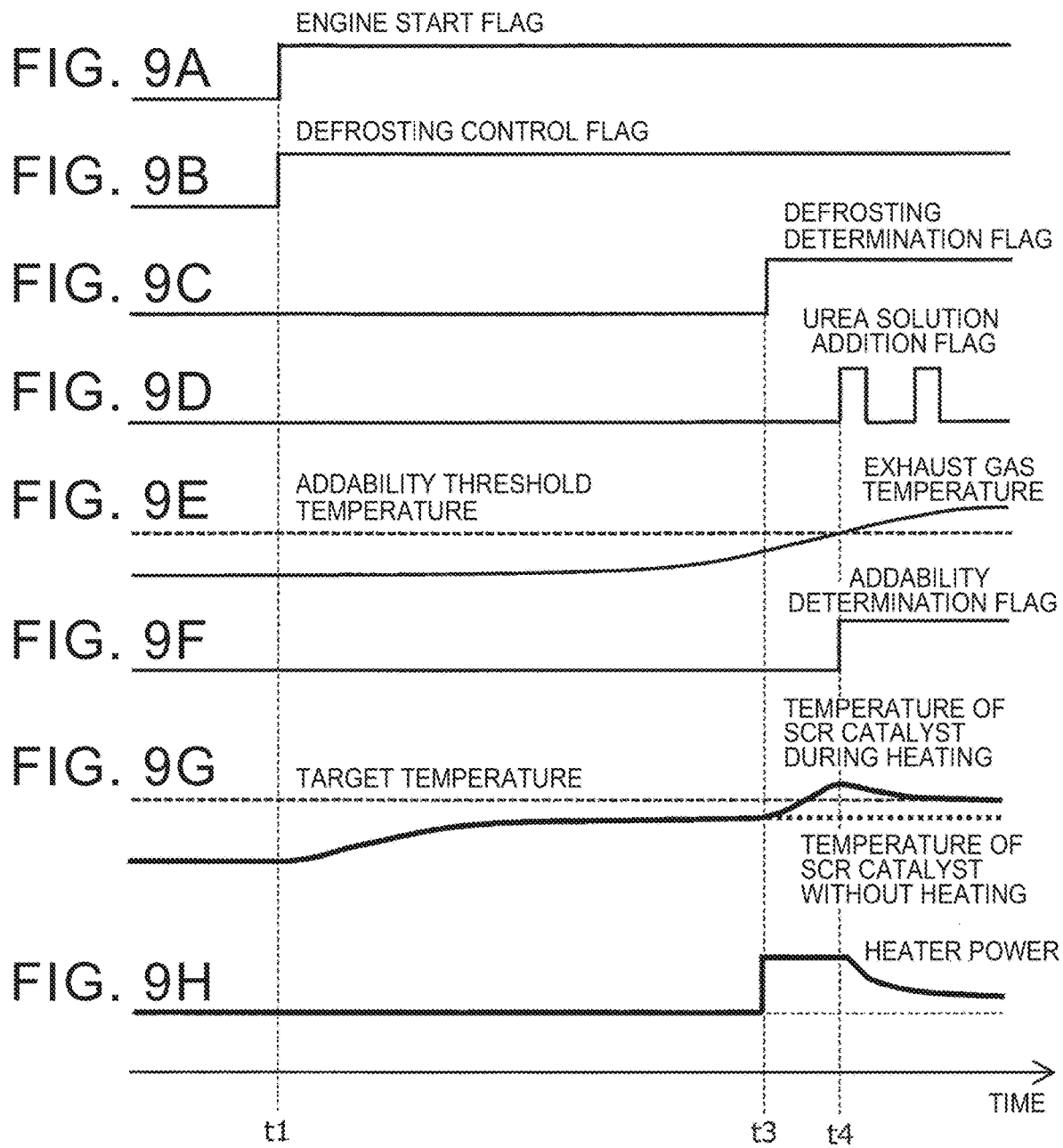

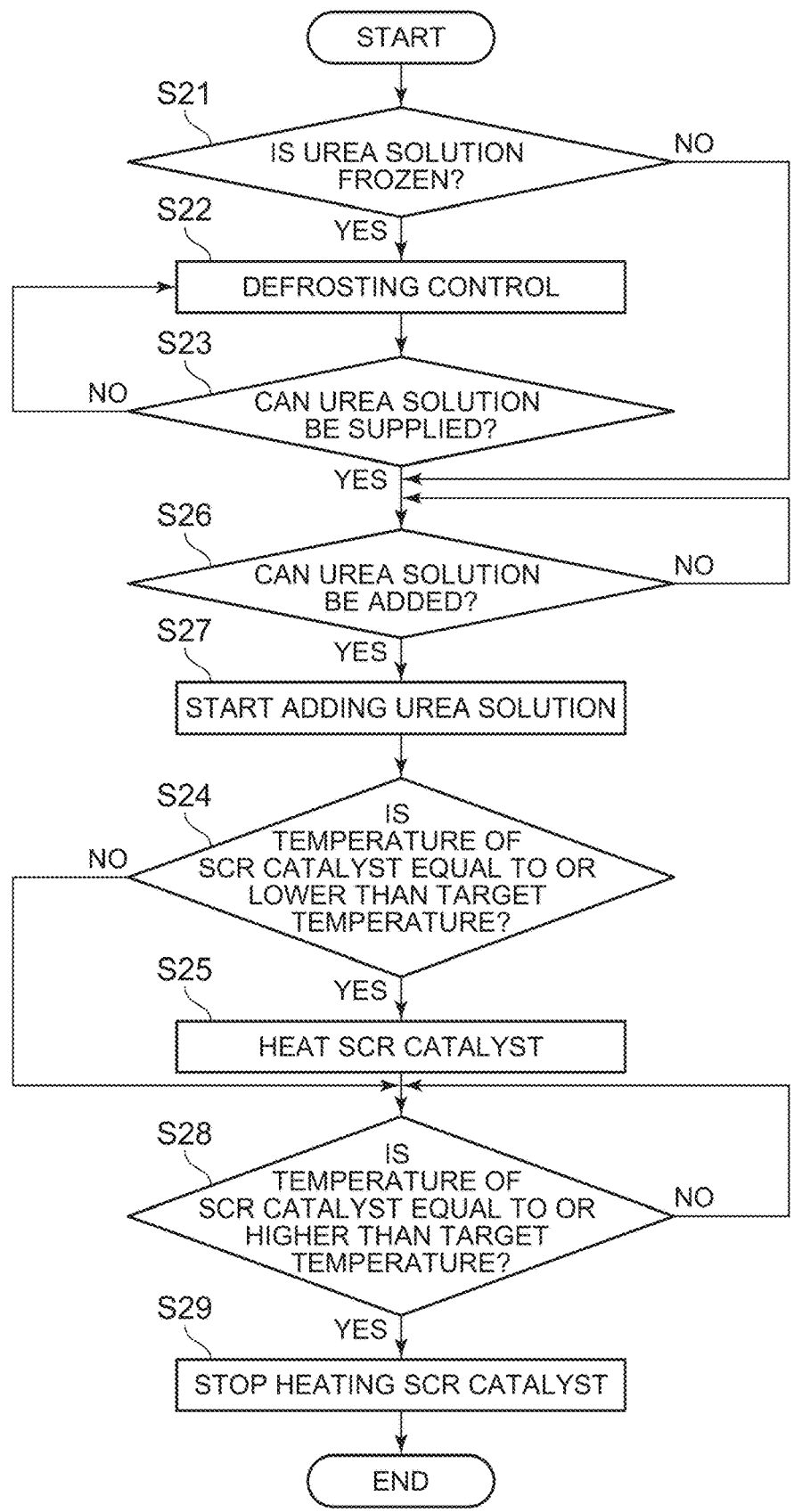

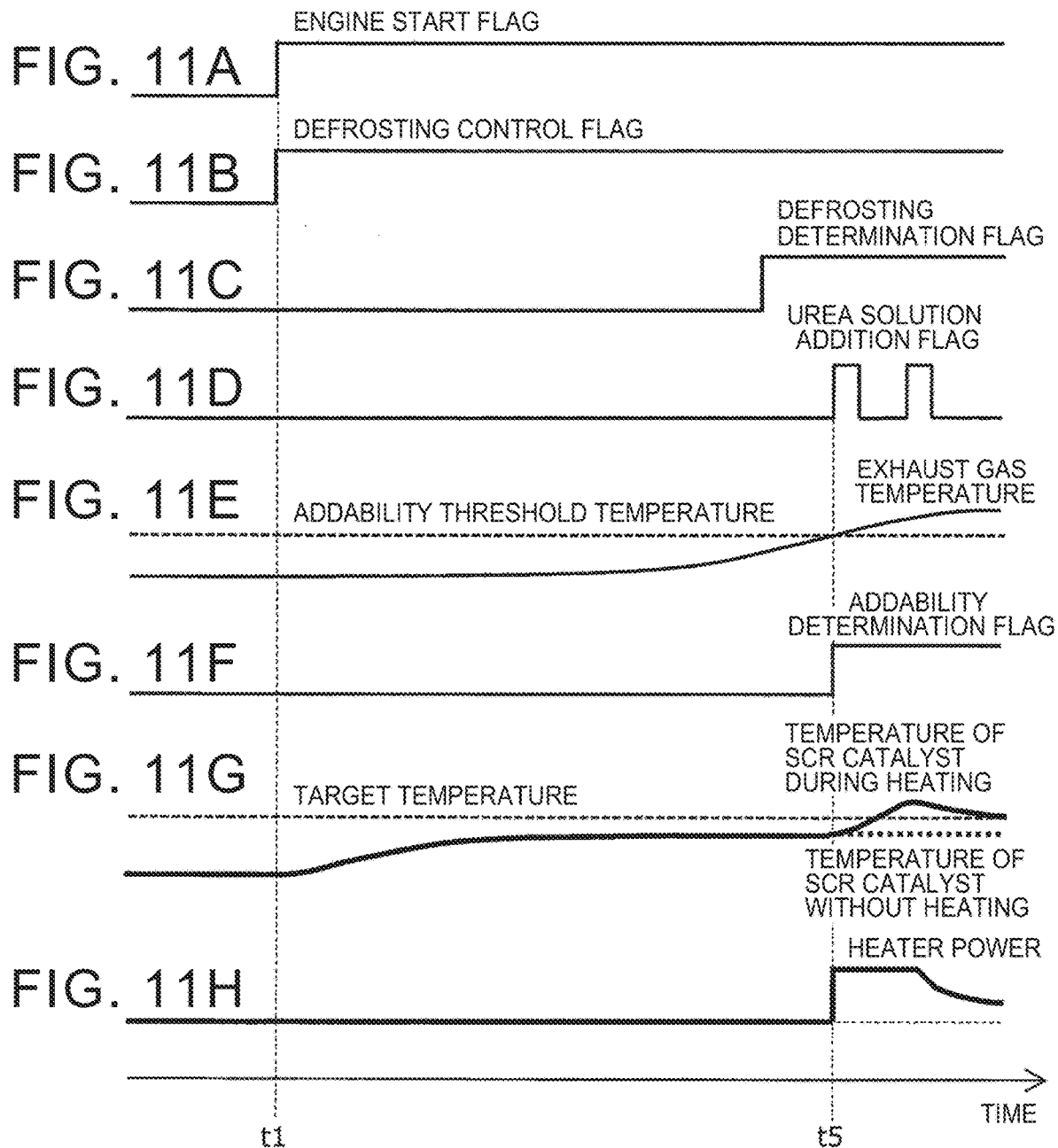

EXHAUST GAS CONTROL APPARATUS FOR INTERNAL COMBUSTION ENGINE

INCORPORATION BY REFERENCE

The disclosure of Japanese Patent Application No. 2019-084703 filed on Apr. 25, 2019 including the specification, drawings and abstract is incorporated herein by reference in its entirety.

BACKGROUND

1. Technical Field

The present disclosure relates to an exhaust gas control apparatus for an internal combustion engine, and more particularly, to an exhaust gas control apparatus configured to remove $NO_x$ in exhaust gas by adding a urea solution to the exhaust gas.

2. Description of Related Art

For example, Japanese Patent No. 6045034 (JP 6045034 B) discloses an exhaust gas control apparatus configured to remove a nitrogen oxide ($NO_x$) in exhaust gas with a reducing agent added to the exhaust gas. Examples of the reducing agent include ammonia ($NH_3$) to be produced by hydrolyzing a urea solution. $NO_x$ in exhaust gas and ammonia adsorbed on a selective catalytic reduction (SCR) catalyst react with each other on the SCR catalyst. Thus, $NO_x$ is reduced and converted into nitrogen. The $NO_x$ removal factor of the SCR catalyst depends on temperature, and a high removal factor cannot be obtained at a low temperature. In the exhaust gas control apparatus disclosed in JP 6045034 B, the SCR catalyst is heated by a heater when an exhaust gas temperature at a predetermined position in an exhaust system is lower than a threshold temperature in a situation in which the urea solution needs to be supplied.

SUMMARY

To remove $NO_x$ with the SCR catalyst, it is necessary that the temperature of the SCR catalyst reach an active temperature and a sufficient amount of ammonia be adsorbed on the SCR catalyst. When the exhaust gas control apparatus is in a state in which ammonia cannot be adsorbed on the SCR catalyst, the $NO_x$ removal factor cannot be increased even if the SCR catalyst is heated. That is, heating energy may be wasted when determination is merely made whether to heat the SCR catalyst based on the temperature of the SCR catalyst.

The present disclosure provides an exhaust gas control apparatus for an internal combustion engine, in which wasteful use of energy for heating an SCR catalyst can be suppressed in a situation in which $NO_x$ removal using a urea solution is difficult.

An exhaust gas control apparatus according to a first aspect of the present disclosure includes a selective catalytic reduction catalyst, a heating device, a urea solution supply device, a controller, and at least one sensor. The selective catalytic reduction catalyst is arranged in an exhaust passage of an internal combustion engine. The heating device is configured to heat the selective catalytic reduction catalyst directly or indirectly. The urea solution supply device is configured to supply a urea solution to an upstream side of the selective catalytic reduction catalyst in the exhaust passage. The controller is configured to operate the heating device and the urea solution supply device. The at least one sensor is configured to acquire information related to a state of the exhaust gas control apparatus.

The controller is configured to execute a state determination process and a heating avoidance process. The state determination process is a process of determining whether the exhaust gas control apparatus is currently in a predetermined state in which ammonia is not adsorbable on the selective catalytic reduction catalyst based on the information from the at least one sensor. The heating avoidance process is a process of avoiding heating the selective catalytic reduction catalyst with the heating device irrespective of an operating condition of the internal combustion engine when the exhaust gas control apparatus is currently in the predetermined state. The heating avoidance includes avoidance of execution of heating, and reduction of energy for the heating as compared to a state other than the predetermined state. By executing those processes, wasteful use of energy for heating the selective catalytic reduction catalyst is suppressed in a situation in which $NO_x$ removal using the urea solution is difficult.

In the aspect described above, the exhaust gas control apparatus may include a defrosting device configured to defrost the urea solution when the urea solution is frozen in the urea solution supply device. When the predetermined state is caused because the urea solution is frozen in the urea solution supply device, the controller may first execute a defrosting start process for starting defrosting the urea solution with the defrosting device. Then, the controller may execute a heating start process for starting heating the selective catalytic reduction catalyst with the heating device by terminating the heating avoidance process after the defrosting start process is executed. By executing those processes, wasteful use of energy due to unnecessary heating of the selective catalytic reduction catalyst can be suppressed in a situation in which the urea solution cannot be supplied due to frosting. A time ranging from the execution of the defrosting start process to the execution of the heating start process may be set based on the information from the at least one sensor, or may be a fixed time.

In the aspect described above, the controller may execute a defrosting completion determination process for determining whether the defrosting device completes defrosting the urea solution after the defrosting start process is executed. Whether the defrosting device completes defrosting the urea solution may be determined based on the information from the at least one sensor.

When the defrosting completion determination process is executed, the controller may execute a urea solution supply start process for starting supplying the urea solution by the urea solution supply device after the heating start process is executed and after the defrosting device completes defrosting the urea solution. The heating start process may be executed after the defrosting device completes defrosting the urea solution, or before the defrosting device completes defrosting the urea solution. The timing after the heating start process is executed includes a timing when the heating start process is executed. The timing after the defrosting device completes defrosting the urea solution includes a timing when the defrosting device completes defrosting the urea solution.

In the aspect described above, the controller may execute a defrosting completion determination process for determining whether the defrosting device completes defrosting the urea solution after the defrosting start process is executed. The controller may execute a urea solution supply start process for starting supplying the urea solution by the urea solution supply device after the defrosting device completes defrosting the urea solution. The controller may execute the heating start process after the urea solution supply start process is executed.

When the defrosting completion determination process is executed, the controller may execute the urea solution supply start process for starting supplying the urea solution by the urea solution supply device after the defrosting device completes defrosting the urea solution, and execute the heating start process after the urea solution supply start process is executed. The timing after the defrosting device completes defrosting the urea solution includes a timing when the defrosting device completes defrosting the urea solution. The timing after the urea solution supply start process is executed includes a timing when the urea solution supply start process is executed.

In the aspect described above, the controller may execute a temperature determination process for determining whether a temperature at a predetermined position in the exhaust passage is increased to a threshold temperature or higher. The controller may execute the urea solution supply start process after the temperature at the predetermined position is increased to the threshold temperature or higher.

In the aspect described above, the controller may execute the temperature determination process for determining whether the temperature at the predetermined position in the exhaust passage is increased to the threshold temperature or higher. The threshold temperature may be set in association with a hydrolysis temperature of the urea solution to produce ammonia.

When the temperature determination process is executed, the controller may execute the urea solution supply start process after the temperature at the predetermined position is increased to the threshold temperature or higher. When the urea solution is defrosted and can be supplied to the exhaust passage but the temperature in the exhaust passage or particularly the temperature at a mixing portion where the urea solution is mixed with exhaust gas is not sufficiently high, the urea solution supplied to the exhaust passage is not hydrolyzed, but urea precipitates. By starting the supply of the urea solution after the temperature in the exhaust passage is increased sufficiently, the precipitation of urea in the urea solution can be suppressed in the exhaust passage.

In the aspect described above, the urea solution supply device may be configured to supply the urea solution to an upstream side of a portion heated by the heating device in the exhaust passage. The controller may be configured such that, when the predetermined state is caused because the urea solution supplied from the urea solution supply device to the exhaust passage is not hydrolyzed, the heating avoidance process is terminated and the heating device starts heating the selective catalytic reduction catalyst after a temperature at a predetermined position in the exhaust passage is increased to a threshold temperature or higher. The threshold temperature may be set in association with the hydrolysis temperature of the urea solution to produce ammonia. By executing those processes, wasteful use of energy due to unnecessary heating of the selective catalytic reduction catalyst can be suppressed in a situation in which the urea solution is supplied to the exhaust passage but is not hydrolyzed into ammonia and urea precipitates.

In the configuration described above, the controller may be configured to avoid, while ammonia is adsorbed on the selective catalytic reduction catalyst in an amount equal to or larger than a reference amount, executing the heating avoidance process though the temperature at the predetermined position is lower than the threshold temperature, and execute the heating avoidance process after an adsorption amount of ammonia on the selective catalytic reduction catalyst is smaller than the reference amount. By executing those processes, ammonia adsorbed on the selective catalytic reduction catalyst can effectively be used for $NO_x$ removal.

In the aspect described above, the controller may be configured such that, when the predetermined state is caused by an abnormality of the exhaust gas control apparatus, the heating avoidance process is continued until the abnormality of the exhaust gas control apparatus is eliminated. By executing this process, wasteful use of energy due to unnecessary heating of the selective catalytic reduction catalyst can be suppressed in a situation in which ammonia cannot be adsorbed on the selective catalytic reduction catalyst due to the abnormality of the exhaust gas control apparatus. The abnormality of the exhaust gas control apparatus includes an abnormality in which ammonia cannot be supplied to the selective catalytic reduction catalyst, and an abnormality in which ammonia cannot be adsorbed on the selective catalytic reduction catalyst.

An exhaust gas control apparatus according to a second aspect of the present disclosure includes a selective catalytic reduction catalyst, a heating device, a urea solution supply device, and a controller. The selective catalytic reduction catalyst is arranged in an exhaust passage of an internal combustion engine. The heating device is configured to heat the selective catalytic reduction catalyst directly or indirectly. The urea solution supply device is configured to supply a urea solution to an upstream side of the selective catalytic reduction catalyst in the exhaust passage. The controller is configured to operate the heating device and the urea solution supply device. The controller is configured to execute a heating avoidance process for avoiding heating the selective catalytic reduction catalyst with the heating device irrespective of an operating condition of the internal combustion engine when the exhaust gas control apparatus is currently in a predetermined state in which ammonia is not adsorbable on the selective catalytic reduction catalyst.

As described above, in the exhaust gas control apparatus according to the present disclosure, the heating of the selective catalytic reduction catalyst with the heating device is avoided irrespective of the operating condition of the internal combustion engine when the exhaust gas control apparatus is currently in the predetermined state in which ammonia is not adsorbable on the selective catalytic reduction catalyst. Thus, wasteful use of energy for heating the selective catalytic reduction catalyst is suppressed in a situation in which $NO_x$ removal using the urea solution is difficult.

BRIEF DESCRIPTION OF THE DRAWINGS

Features, advantages, and technical and industrial significance of exemplary embodiments will be described below with reference to the accompanying drawings, in which like signs denote like elements, and wherein:

FIG. 5 is an explanatory drawing of a technical idea common to the embodiments;

FIG. 6 is an explanatory drawing of an overview of first to third embodiments;

FIG. 7 is a flowchart illustrating a control flow of the first embodiment;

FIG. 8A is a diagram illustrating one control example based on the control flow of the first embodiment;

FIG. 8B is a diagram illustrating the one control example based on the control flow of the first embodiment;

FIG. 8C is a diagram illustrating the one control example based on the control flow of the first embodiment;

FIG. 8D is a diagram illustrating the one control example based on the control flow of the first embodiment;

FIG. 8E is a diagram illustrating the one control example based on the control flow of the first embodiment;

FIG. 8F is a diagram illustrating the one control example based on the control flow of the first embodiment;

FIG. 8G is a diagram illustrating the one control example based on the control flow of the first embodiment;

FIG. 8H is a diagram illustrating the one control example based on the control flow of the first embodiment;

FIG. 8I is a diagram illustrating a comparative example to the control flow of the first embodiment;

FIG. 8J is a diagram illustrating the comparative example to the control flow of the first embodiment;

FIG. 9A is a diagram illustrating another control example based on the control flow of the first embodiment;

FIG. 9B is a diagram illustrating the other control example based on the control flow of the first embodiment;

FIG. 9C is a diagram illustrating the other control example based on the control flow of the first embodiment;

FIG. 9D is a diagram illustrating the other control example based on the control flow of the first embodiment;

FIG. 9E is a diagram illustrating the other control example based on the control flow of the first embodiment;

FIG. 9F is a diagram illustrating the other control example based on the control flow of the first embodiment;

FIG. 9G is a diagram illustrating the other control example based on the control flow of the first embodiment;

FIG. 9H is a diagram illustrating the other control example based on the control flow of the first embodiment;

FIG. 10 is a flowchart illustrating a control flow of the second embodiment;

FIG. 11A is a diagram illustrating a control example based on the control flow of the second embodiment;

FIG. 11B is a diagram illustrating the control example based on the control flow of the second embodiment;

FIG. 11C is a diagram illustrating the control example based on the control flow of the second embodiment;

FIG. 11D is a diagram illustrating the control example based on the control flow of the second embodiment;

FIG. 11E is a diagram illustrating the control example based on the control flow of the second embodiment;

FIG. 11F is a diagram illustrating the control example based on the control flow of the second embodiment;

FIG. 11G is a diagram illustrating the control example based on the control flow of the second embodiment;

FIG. 11H is a diagram illustrating the control example based on the control flow of the second embodiment;

DETAILED DESCRIPTION OF EMBODIMENTS

Embodiments are described below with reference to the drawings. When the numerals of numbers, quantities, amounts, ranges, and the like of elements are mentioned in the following embodiments, the present disclosure is not limited to the numerals unless otherwise mentioned explicitly or unless explicitly specified in principle. Structures, steps, and the like in the following embodiments are not essential to the present disclosure unless otherwise mentioned explicitly or unless explicitly specified in principle.

1. Structure of Exhaust Gas Control Apparatus

Figure 1:
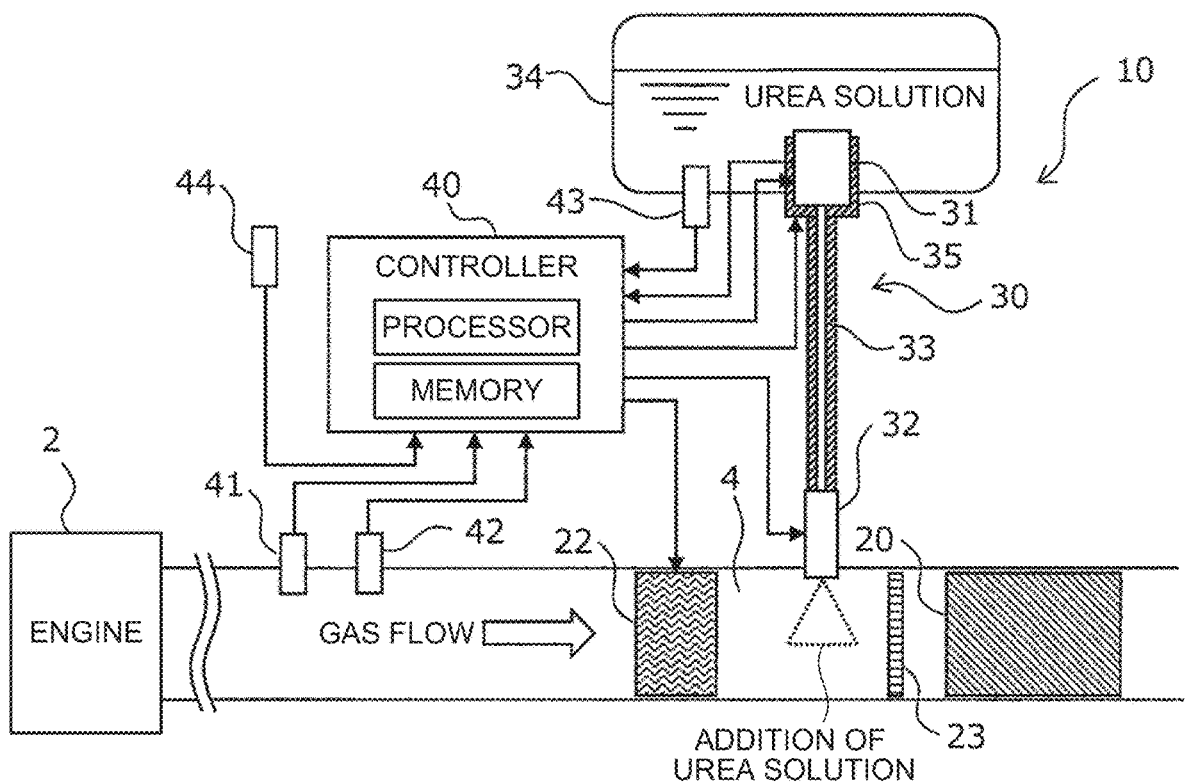
FIG. 1 is a schematic diagram illustrating the structure of an exhaust gas control apparatus according to each embodiment.

First, the structure of an exhaust gas control apparatus according to each embodiment is described with reference to FIG. 1. FIG. 1 schematically illustrates a part of an exhaust system for an internal combustion engine 2. For example, the internal combustion engine 2 is a diesel engine. An exhaust passage 4 of the internal combustion engine 2 is provided with an exhaust gas control apparatus 10 configured to remove $NO_x$ contained in exhaust gas. The exhaust gas control apparatus 10 is a urea-SCR system configured to reduce $NO_x$ in exhaust gas with a urea solution added to the exhaust gas.

The exhaust gas control apparatus 10 includes an SCR catalyst 20, a heating device 22, and a urea solution supply device 30. The SCR catalyst 20 converts $NO_x$ in exhaust gas into a nitrogen molecule and water by using adsorbed ammonia as a reducing agent. The exhaust passage 4 is provided with devices such as a diesel particulate filter (DPF) and an oxidation catalyst other than the SCR catalyst 20. Those devices are omitted in FIG. 1. The SCR catalyst 20 may be an SCR filter integrated with the DPF.

The heating device 22 is arranged on an upstream side of the SCR catalyst 20 in the exhaust passage 4. The heating device 22 heats exhaust gas flowing through the exhaust passage 4 to indirectly heat the SCR catalyst 20 located on a downstream side of the heating device 22. Specifically, the heating device 22 is an electric heater. The heating device 22 may be a burner configured to heat exhaust gas by burning gas or liquid fuel.

The urea solution supply device 30 includes a urea solution addition valve 32, a urea solution tank 34, a urea solution supply pipe 33, and an electric urea solution pump 31. The urea solution addition valve 32 is attached to the exhaust passage 4 on the upstream side of the SCR catalyst 20. The urea solution tank 34 stores a urea solution. The urea solution supply pipe 33 connects the urea solution tank 34 and the urea solution addition valve 32. The urea solution pump 31 sends the urea solution in the urea solution tank 34 to the urea solution supply pipe 33. A mixer 23 is provided between the urea solution addition valve 32 and the SCR catalyst 20. The mixer 23 stirs gas passing through the mixer 23 to accelerate mixing of the urea solution and the exhaust gas. The mixer 23 is not essential. More specifically, the urea solution addition valve 32 is arranged on the downstream side of the heating device 22 in the exhaust passage 4. Heat energy supplied from the heating device 22 to the exhaust gas is used for hydrolyzing the urea solution.

The urea solution supply device 30 includes a defrosting device 35 configured to defrost a urea solution frozen under a low-temperature environment. Specifically, the defrosting device 35 is an electric heater. The electric heater serving as the defrosting device 35 is attached to the urea solution pump 31 to defrost a frozen urea solution in the urea solution tank 34, and is also attached to the urea solution supply pipe 33 to defrost a frozen urea solution in the urea solution supply pipe 33.

The exhaust gas control apparatus 10 includes a plurality of sensors configured to acquire information related to the state of the exhaust gas control apparatus 10 and information related to the state of exhaust gas. An exhaust gas temperature sensor 41 is provided on the upstream side of the SCR catalyst 20 in the exhaust passage 4. Temperature information acquired by the exhaust gas temperature sensor 41 is used for determining whether to add the urea solution by the urea solution addition valve 32. Further, the temperature information is used for estimating the temperature of the SCR catalyst 20. In FIG. 1, the exhaust gas temperature sensor 41 is arranged on an upstream side of the heating device 22, but may be arranged near an inlet or outlet of the SCR catalyst 20. Exhaust gas temperature sensors may be arranged on the upstream side and the downstream side of the SCR catalyst 20.

A $NO_x$ sensor 42 is provided on the upstream side of the SCR catalyst 20 in the exhaust passage 4. $NO_x$ concentration information acquired by the $NO_x$ sensor 42 is used for determining whether to add the urea solution by the urea solution addition valve 32. In FIG. 1, the $NO_x$ sensor 42 is arranged on the upstream side of the heating device 22, but may be arranged near the inlet or outlet of the SCR catalyst 20.

A urea solution temperature sensor 43 is provided in the urea solution tank 34. The urea solution temperature sensor 43 may be installed in the urea solution pump 31. Temperature information acquired by the urea solution temperature sensor 43 is used for determining whether the urea solution in the urea solution tank 34 is frozen. Whether the urea solution is frozen may be determined based on temperature information acquired by an outside air temperature sensor 44. The temperature information acquired by the outside air temperature sensor 44 may be used for determining whether the urea solution is frozen in place of or in combination with the temperature information acquired by the urea solution temperature sensor 43.

The exhaust gas control apparatus 10 further includes a controller 40. The controller 40 acquires information from various sensors described above, and outputs operation signals to the devices such as the heating device 22, the urea solution pump 31, and the urea solution addition valve 32. The controller 40 is an electronic control unit (ECU) including at least one processor and at least one memory. The memory includes a non-volatile memory and a volatile memory. The non-volatile memory stores at least one control program (program executable by a computer) and data. The volatile memory temporarily stores calculation results from the processor and information acquired from each sensor. The program stored in the memory is executed by the processor to cause the processor to execute various processes described later.

2. Technical Idea Common to Embodiments

A technical idea common to the embodiments is described below.

Figure 2:
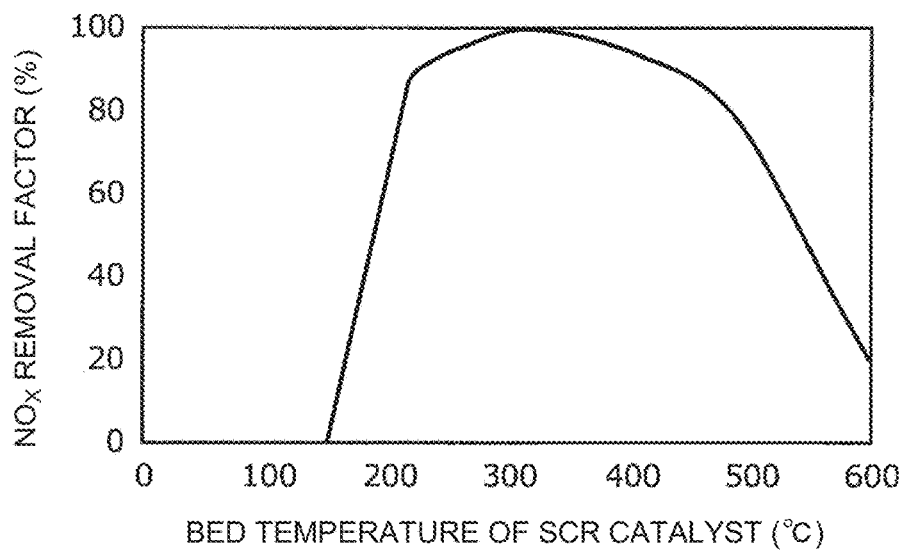
FIG. 2 is a diagram illustrating a relationship between a bed temperature of an SCR catalyst and a $NO_x$ removal factor.

The $NO_x$ removal factor of the SCR catalyst 20 depends on the temperature of the SCR catalyst 20. FIG. 2 illustrates a relationship between a bed temperature of the SCR catalyst 20 and the $NO_x$ removal factor. FIG. 2 demonstrates that the SCR catalyst 20 cannot obtain a high $NO_x$ removal factor unless the temperature of the SCR catalyst 20 is increased to an active temperature. When the temperature of the SCR catalyst 20 is not increased to the active temperature in a situation in which $NO_x$ removal is needed, it is necessary that the heating device 22 be operated to generate heat and the SCR catalyst 20 be indirectly heated by the heat supplied from the heating device 22 to exhaust gas.

Figure 3:
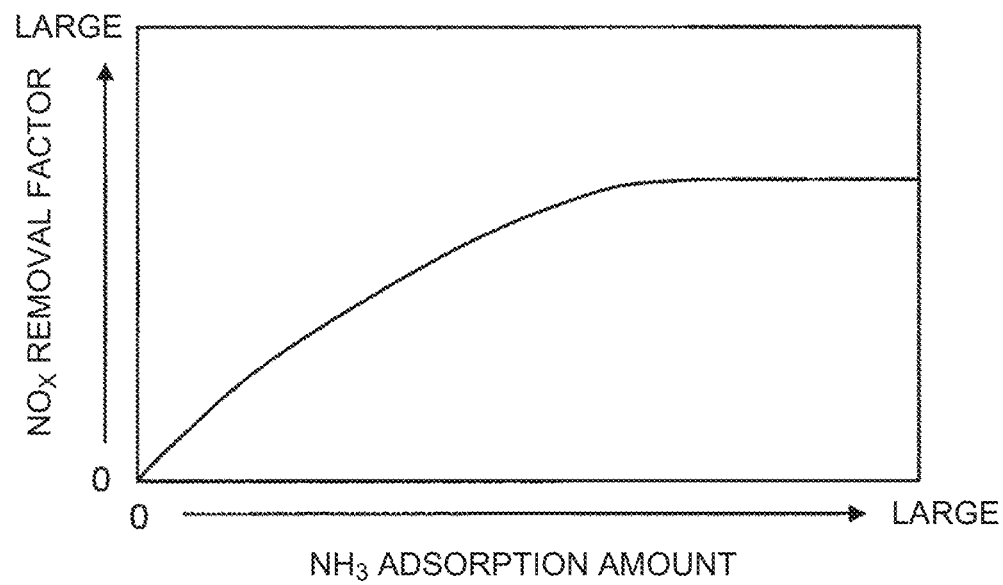
FIG. 3 is a diagram illustrating a relationship between an ammonia adsorption amount of the SCR catalyst and the $NO_x$ removal factor.

The $NO_x$ removal factor of the SCR catalyst 20 depends not only on the temperature of the SCR catalyst 20 but also on the adsorption amount of ammonia serving as the reducing agent. FIG. 3 illustrates a relationship between the ammonia adsorption amount of the SCR catalyst 20 and the $NO_x$ removal factor. FIG. 3 demonstrates that a sufficient amount of ammonia needs to be adsorbed on the SCR catalyst 20 to remove $NO_x$ with the SCR catalyst 20. When ammonia is not adsorbed on the SCR catalyst 20, $NO_x$ cannot be removed even if the SCR catalyst 20 is heated to the active temperature. When the exhaust gas control apparatus 10 is in a state in which ammonia cannot be adsorbed on the SCR catalyst 20, energy is wasted by operating the heating device 22.

The state of the exhaust gas control apparatus 10 in which ammonia cannot be adsorbed on the SCR catalyst 20 is roughly classified into the following three states. The first state is that a urea solution necessary to produce ammonia cannot be supplied. This state is caused by an abnormality of the exhaust gas control apparatus 10, or particularly an abnormality of the urea solution supply device 30 or a control system. This state is also caused, irrespective of the abnormality, when the urea solution is frozen in the urea solution supply device 30 under a low-temperature environment.

Figure 4:
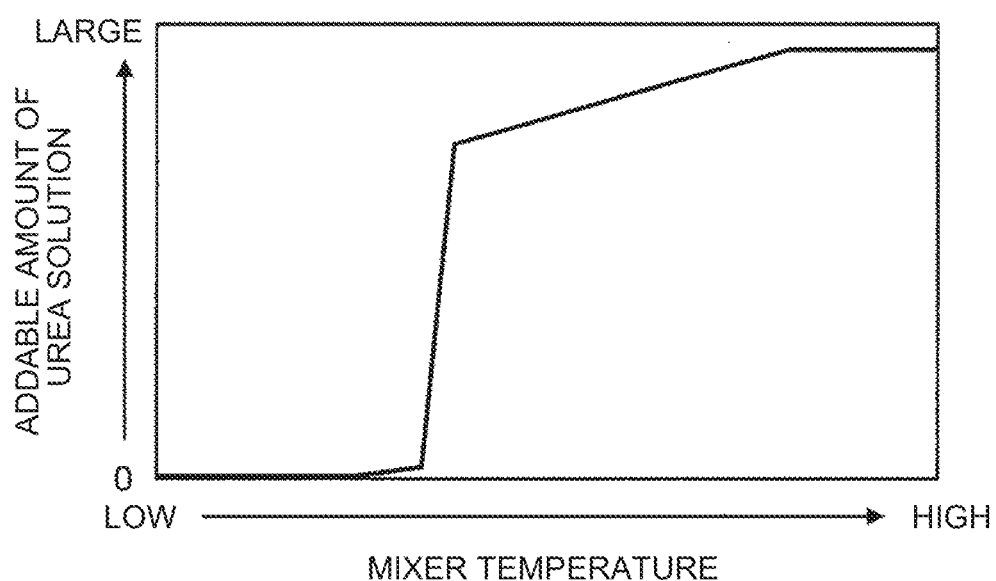
FIG. 4 is a diagram illustrating a relationship between a mixer temperature and an addable amount of a urea solution.

The second state is that the urea solution can be supplied but ammonia is not produced. To produce ammonia from the urea solution, it is necessary that the temperature at a location where the urea solution is added is equal to or higher than a hydrolysis temperature of the urea solution. At a temperature lower than the hydrolysis temperature, the urea solution is not hydrolyzed, but urea precipitates and is deposited on, for example, the mixer 23 in the exhaust passage 4. FIG. 4 illustrates a relationship between a mixer temperature and an addable amount of the urea solution, that is, an upper limit addition amount at which the deposit is not generated.

The third state is that ammonia can be produced but the SCR catalyst 20 cannot adsorb ammonia. This state is caused by an abnormality of the exhaust gas control apparatus 10, or particularly an abnormality of the SCR catalyst 20.

When the exhaust gas control apparatus 10 is in any one of the predetermined states described above, it is desirable to avoid heating the SCR catalyst 20 with the heating device 22. This process is referred to as a heating avoidance process. The heating avoidance process is executed irrespective of the operating condition of the internal combustion engine 2. That is, the heating of the SCR catalyst 20 with the heating device 22 is avoided irrespective of the operating condition of the internal combustion engine 2. The heating avoidance includes avoidance of the operation of the heating device 22, and reduction of energy to be supplied to the heating device 22 as compared to a state other than the predetermined states. Examples of the reduction of energy include preheating with low power.

FIG. 5 is a flowchart illustrating a control flow that represents the technical idea described above. The program stored in the memory of the controller 40 is created so that the processor executes a process that embodies the technical idea represented by this control flow.

Referring to the flowchart of FIG. 5, a state determination process is first executed in Step S1 to determine whether the exhaust gas control apparatus 10 is currently in a predetermined state. The predetermined state is the state in which ammonia cannot be adsorbed on the SCR catalyst 20. The state determination is made by using information from at least one of various sensors of the exhaust gas control apparatus 10. When the exhaust gas control apparatus 10 is currently in the predetermined state, the heating avoidance process is executed next in Step S2 to avoid heating the SCR catalyst 20 with the heating device 22 irrespective of the operating condition of the internal combustion engine 2. By executing those processes, wasteful use of energy for heating the SCR catalyst 20 is suppressed in a situation in which $NO_x$ removal using the urea solution is difficult.

3. Overview of First to Third Embodiments

First to third embodiments have a common technical idea as a subordinate concept that is included in the technical idea described above as a superordinate concept. In the first to third embodiments, the predetermined state in which ammonia cannot be adsorbed on the SCR catalyst 20 is the first state, that is, the state in which a urea solution necessary to produce ammonia cannot be supplied, and particularly the state in which the urea solution is frozen in the urea solution supply device 30. The urea solution may be frozen in the urea solution tank 34, in the urea solution supply pipe 33, or in the urea solution pump 31. In any case, the frozen urea solution cannot be supplied to the exhaust passage 4.

The frozen urea solution can be defrosted by heating with the defrosting device 35. When the urea solution is frozen in the urea solution supply device 30 but the defrosting device 35 starts defrosting, the urea solution can be supplied. Therefore, the heating of the SCR catalyst 20 with the heating device 22 is effective. The heating avoidance process is terminated under a necessary condition that the defrosting device 35 starts defrosting. Thus, the heating device 22 can start heating the SCR catalyst 20.

FIG. 6 is a flowchart illustrating a control flow that represents the technical idea common to the first to third embodiments. In the first to third embodiments, the program stored in the memory of the controller 40 is created so that the processor executes a process that embodies the technical idea represented by this control flow.

Referring to the flowchart of FIG. 6, determination is first made in Step S11 whether the heating avoidance process is executed because the urea solution is frozen in the urea solution supply device 30. When ammonia cannot be adsorbed on the SCR catalyst 20 because the urea solution is frozen, a defrosting start process is executed in Step S12 to start defrosting the urea solution with the defrosting device 35. The start of defrosting means the start of energization of the defrosting device 35 that is the electric heater. After the defrosting start process is executed, the heating avoidance process is terminated in Step S13, and a heating start process is executed in Step S14 to start heating the SCR catalyst 20 with the heating device 22. The start of heating means the start of energization of the heating device 22 that is the electric heater. A time ranging from the execution of the defrosting start process to the execution of the heating start process may be set based on information from a sensor, or may be a fixed time. The heating start process may be executed simultaneously with the execution of the defrosting start process. By executing those processes, wasteful use of energy due to unnecessary heating of the SCR catalyst 20 can be suppressed in a situation in which the urea solution cannot be supplied due to frosting.

The following disclosure of the first to third embodiments attains, in addition to the technical idea described above, a common technical idea regarding the exhaust gas control apparatus: "in the exhaust gas control apparatus including the SCR catalyst arranged in the exhaust passage of the internal combustion engine, the heating device configured to heat the SCR catalyst directly or indirectly, the urea solution supply device configured to supply the urea solution to the upstream side of the SCR catalyst in the exhaust passage, the defrosting device configured to defrost the urea solution when the urea solution is frozen in the urea solution supply device, the controller configured to operate the heating device, the urea solution supply device, and the defrosting device, and at least one sensor configured to acquire information related to the state of the exhaust gas control apparatus, the controller determines whether the urea solution is frozen in the urea solution supply device based on the information from the at least one sensor, starts defrosting the urea solution with the defrosting device when the urea solution is frozen in the urea solution supply device, and starts heating the SCR catalyst with the heating device after the defrosting device starts defrosting the urea solution."

4. Details of First Embodiment

The first embodiment is described in detail with reference to FIG. 7 to FIG. 9H.

FIG. 7 is a flowchart illustrating a control flow of the first embodiment. In the first embodiment, the program stored in the memory of the controller 40 is created so that the processor executes each process illustrated in this flowchart.

Referring to the flowchart of FIG. 7, determination is first made in Step S21 whether the urea solution is frozen in the urea solution supply device 30. This determination is made by using information from at least one of the plurality of sensors of the exhaust gas control apparatus 10. Examples of the information include information from the urea solution temperature sensor 43 arranged in the urea solution tank 34, and information from the outside air temperature sensor 44.

When the information from the urea solution temperature sensor 43 is used, the determination whether the urea solution is frozen may be made based on whether a urea solution temperature acquired by the urea solution temperature sensor 43 is equal to or lower than a threshold. The threshold may be set to a freezing point of the urea solution, or a temperature slightly higher than the freezing point in consideration of measurement variations of the urea solution temperature sensor 43. When the information from the outside air temperature sensor 44 is used, the determination whether the urea solution is frozen may be made by comparing a current outside air temperature and the threshold in a case of a cold start of the internal combustion engine 2. After the internal combustion engine 2 is stopped, the determination whether the urea solution is frozen may be made based on an outside air temperature acquired when the operation of the internal combustion engine 2 is stopped, and an elapsed time from the stop of the operation of the internal combustion engine 2.

When determination is made that the urea solution is frozen, defrosting control is executed in Step S22. In the defrosting control, the controller 40 supplies the defrosting device 35 with electric power for causing the electric heater to generate heat. For example, the supplied electric power is set to maximum electric power unless a heat shock occurs. The supplied electric power may be changed depending on a urea solution temperature measured by the urea solution temperature sensor 43 or a urea solution temperature estimated based on supplied electric energy.

During the execution of the defrosting control, determination is made in Step S23 whether the urea solution supply device 30 can supply the urea solution. That is, a defrosting completion determination process is executed to determine whether the frozen urea solution is defrosted and the urea solution pump 31 can pump up the urea solution out of the urea solution tank 34 and send the pumped-up urea solution to the urea solution addition valve 32. For example, this determination may be made based on an operating time of the defrosting device 35. Specifically, an operating time of the defrosting device 35 that is necessary for defrosting may be calculated based on a urea solution temperature immediately before the defrosting control is executed, and determination may be made that the urea solution can be supplied when the operating time reaches the necessary operating time.

The determination in Step S23 may be made by using information from the urea solution temperature sensor 43. Specifically, the determination whether the urea solution is defrosted may be made based on whether a urea solution temperature acquired by the urea solution temperature sensor 43 is higher than a threshold. The threshold may be set to a melting point of the urea solution, or a temperature slightly higher than the melting point in consideration of measurement variations of the urea solution temperature sensor 43. When the urea solution pump 31 is operated simultaneously with the start of the defrosting control or during the execution of the defrosting control, the rotation speed and the discharge pressure of the urea solution pump 31 increase as the defrosting of the frozen urea solution is advanced. Therefore, the discharge pressure or the rotation speed of the urea solution pump 31 may be measured, and the determination whether the urea solution is defrosted may be made based on a change in the value of the discharge pressure or the rotation speed.

The processes of Step S22 and Step S23 are repeated until the urea solution can be supplied. When the urea solution can be supplied, determination is made in Step S24. When determination is made in Step S21 that the urea solution is not frozen, the defrosting control is skipped. In this case, the determination in Step S24 is made immediately.

In Step S24, determination is made whether the temperature of the SCR catalyst 20 is equal to or lower than a target temperature. For example, the temperature of the SCR catalyst 20 may be estimated based on a temperature of exhaust gas flowing into the SCR catalyst 20 or a temperature of exhaust gas that has passed through the SCR catalyst 20. The bed temperature of the SCR catalyst 20 may directly be measured as the temperature of the SCR catalyst 20. The target temperature may be set to the active temperature of the SCR catalyst 20 or a temperature around the active temperature.

When the temperature of the SCR catalyst 20 is equal to or lower than the target temperature, the SCR catalyst 20 is heated in Step S25. That is, the heating device 22 is operated to generate heat by supplying electric power from the controller 40 to the heating device 22, and the SCR catalyst 20 is indirectly heated by the heat supplied from the heating device 22 to exhaust gas. While the temperature of the SCR catalyst 20 is equal to or lower than the target temperature, the electric power supplied to the heating device 22 is set to, for example, rated power of the heating device 22.

After the process of Step S25, determination is made in Step S26. When the temperature of the SCR catalyst 20 is higher than the target temperature, Step S25 is skipped, and determination is made in Step S26.

In Step S26, determination is made whether the urea solution can be added by the urea solution addition valve 32. Specifically, a temperature determination process is executed to determine whether the temperature at a predetermined position in the exhaust passage 4 is increased to a threshold temperature at which urea in the urea solution does not precipitate when the urea solution is added into exhaust gas from the urea solution addition valve 32. For example, the threshold temperature is set in association with the hydrolysis temperature of the urea solution to produce ammonia. For example, the predetermined position may be the arrangement position of the exhaust gas temperature sensor 41 or the position of the mixer 23. The temperature around the mixer 23 can be estimated based on temperature information acquired from the exhaust gas temperature sensor 41.

The processes of Step S24, Step S25, and Step S26 or the processes of Step S24 and Step S26 are repeated until the urea solution can be added. When the urea solution can be added, a urea solution supply start process is executed in Step S27. That is, addition of the urea solution into exhaust gas from the urea solution addition valve 32 is started. By starting the addition of the urea solution after waiting for the temperature at which the urea solution is hydrolyzed, precipitation of urea in the urea solution can be suppressed in the exhaust passage 4.

Next, determination is made in Step S28 whether the temperature of the SCR catalyst 20 is equal to or higher than the target temperature. The determination in Step S28 is repeated until the temperature of the SCR catalyst 20 is equal to or higher than the target temperature. When the temperature of the SCR catalyst 20 is equal to or higher than the target temperature, the heating device 22 stops heating the SCR catalyst 20 in Step S29. The stop of heating of the SCR catalyst 20 herein means that a further increase in the temperature of the SCR catalyst 20 is suppressed. The energization of the heating device 22 may be stopped completely, or the electric power supplied to the heating device 22 may be reduced.

Next, description is given of control examples based on the control flow of the first embodiment. FIG. 8A to FIG. 8J are diagrams illustrating one control example based on the control flow of the first embodiment. In FIG. 8A to FIG. 8J, a time axis is shared. A vertical axis of FIG. 8A represents an engine start flag. This flag is turned ON when the internal combustion engine 2 is started. A vertical axis of FIG. 8B represents a defrosting control flag. This flag is turned ON when freezing of the urea solution is detected and the defrosting control is executed. When this flag is ON, the result of determination in Step S21 is "Yes".

A vertical axis of FIG. 8C represents a defrosting determination flag. This flag is turned ON when the urea solution can be supplied because the urea solution is defrosted through the defrosting control. When this flag is ON, the result of determination in Step S23 is "Yes". A vertical axis of FIG. 8D represents a urea solution addition flag. This flag is turned ON when the urea solution is added into exhaust gas through the operation of the urea solution addition valve 32.

A vertical axis of FIG. 8E represents an exhaust gas temperature. FIG. 8E illustrates an addability threshold temperature, that is, a threshold temperature at the predetermined position in the exhaust passage 4 at which the urea solution can be added without causing precipitation. A vertical axis of FIG. 8F represents an addability determination flag. This flag is turned ON when the exhaust gas temperature is equal to or higher than the addability threshold temperature. When this flag is ON, the result of determination in Step S26 is "Yes".

Vertical axes of FIG. 8G and FIG. 8I represent the temperature of the SCR catalyst 20. FIG. 8G and FIG. 8I illustrate the target temperature. A continuous line represents a change in the temperature of the SCR catalyst 20 when the SCR catalyst 20 is heated by the heating device 22. A dashed line represents a change in the temperature of the SCR catalyst 20 when the SCR catalyst 20 is not heated. Vertical axes of FIG. 8H and FIG. 8J represent electric power supplied to the heating device 22, that is, heater power. FIG. 8G and FIG. 8H illustrate the control example based on the control flow of the first embodiment. FIG. 8I and FIG. 8J illustrate a comparative example to the control example.

In the comparative example, the heating device 22 starts heating the SCR catalyst 20 simultaneously with the execution of the defrosting control at a time t1 when the engine is started. Therefore, the temperature of the SCR catalyst 20 is increased to the target temperature at an early stage. However, the urea solution cannot be added into exhaust gas until the defrosting of the urea solution is completed. In the comparative example, the SCR catalyst 20 is unnecessarily heated in a situation in which the urea solution cannot be supplied due to frosting.

According to the control example based on the control flow of the first embodiment, the heating device 22 starts heating the SCR catalyst 20 at a time t2 when the frozen urea solution is defrosted after the defrosting control is executed. As compared to the comparative example, it is possible to reduce an unnecessary heating time in a situation in which the urea solution cannot be supplied due to frosting. Therefore, wasteful use of energy can be suppressed. In this control example, the exhaust gas temperature is equal to or higher than the threshold of an addable ambient temperature before the defrosting of the urea solution is completed. Therefore, addition of the urea solution into exhaust gas is started simultaneously with the completion of the defrosting of the urea solution.

FIG. 9A to FIG. 9H are diagrams illustrating another control example based on the control flow of the first embodiment. In FIG. 9A to FIG. 9H, a time axis is shared. Vertical axes of FIG. 9A to FIG. 9H are identical to the vertical axes of the graphs of FIG. 8A to FIG. 8H. In this control example, the heating device 22 starts heating the SCR catalyst 20 at a time t3 when the frozen urea solution is defrosted after the defrosting control is executed similarly to the previous control example, instead of the time t1 when the engine is started. In this control example, the exhaust gas temperature is equal to or higher than the addability threshold temperature at a time t4 after the time t3 when the defrosting of the urea solution is completed. Therefore, addition of the urea solution into exhaust gas is started with a time interval after the heating device 22 starts heating the SCR catalyst 20.

5. Details of Second Embodiment

The second embodiment is described in detail with reference to FIG. 10 and FIG. 11A to FIG. 11H.

FIG. 10 is a flowchart illustrating a control flow of the second embodiment. In the control flow of the first embodiment, the heating of the SCR catalyst 20 is started after the urea solution is defrosted and before the urea solution supply start process is executed. In the control flow of the second embodiment, the heating of the SCR catalyst 20 is started after the urea solution is defrosted and the urea solution supply start process is executed. In the second embodiment, the program stored in the memory of the controller 40 is created so that the processor executes each process illustrated in this flowchart. In the flowchart of FIG. 10, the same step numbers are assigned to processes identical to the processes illustrated in the flowchart of FIG. 7.

Referring to the flowchart of FIG. 10, determination is first made in Step S21 whether the urea solution is frozen in the urea solution supply device 30. When determination is made that the urea solution is frozen, the defrosting control is executed in Step S22. During the execution of the defrosting control, the defrosting completion determination process is executed in Step S23 to determine whether the urea solution supply device 30 can supply the urea solution.

The processes of Step S22 and Step S23 are repeated until the urea solution can be supplied. When the urea solution can be supplied, determination is made in Step S26. When determination is made in Step S21 that the urea solution is not frozen, the defrosting control is skipped. In this case, the determination in Step S26 is made immediately.

In Step S26, the temperature determination process is executed to determine whether the urea solution can be added by the urea solution addition valve 32. The process of Step S26 is repeated until the urea solution can be added. When the urea solution can be added, the urea solution supply start process is executed in Step S27 to start adding the urea solution into exhaust gas from the urea solution addition valve 32.

Next, determination is made in Step S24 whether the temperature of the SCR catalyst 20 is equal to or lower than the target temperature. When the temperature of the SCR catalyst 20 is equal to or lower than the target temperature, the SCR catalyst 20 is heated in Step S25. After the process of Step S25, determination is made in Step S28. In Step S28, determination is made whether the temperature of the SCR catalyst 20 is equal to or higher than the target temperature. The determination in Step S28 is repeated until the temperature of the SCR catalyst 20 is equal to or higher than the target temperature. When the temperature of the SCR catalyst 20 is equal to or higher than the target temperature, the heating device 22 stops heating the SCR catalyst 20 in Step S29.

Next, description is given of a control example based on the control flow of the second embodiment. FIG. 11A to FIG. 11H are diagrams illustrating one control example based on the control flow of the second embodiment. In FIG. 11A to FIG. 11H, a time axis is shared. Vertical axes of FIG. 11A to FIG. 11H are identical to the vertical axes of FIG. 8A to FIG. 8H and FIG. 9A to FIG. 9H.

According to the control example based on the control flow of the second embodiment, the heating device 22 starts heating the SCR catalyst 20 at a time t5 when the frozen urea solution is defrosted after the defrosting control is executed and then the exhaust gas temperature is equal to or higher than the addability threshold temperature. As compared to the comparative example in which the heating is started at the time t1 when the engine is started (see FIG. 8I and FIG. 8J), it is possible to reduce an unnecessary heating time in a situation in which the urea solution cannot be supplied due to frosting. Therefore, wasteful use of energy can be suppressed.

In this control example, the defrosting of the urea solution is completed before the exhaust gas temperature is equal to or higher than the threshold of the addable ambient temperature. According to the control flow of the second embodiment, when the exhaust gas temperature is equal to or higher than the threshold of the addable ambient temperature before the defrosting of the urea solution is completed, the heating device 22 starts heating the SCR catalyst 20 at a time when the defrosting of the urea solution is completed.

6. Details of Third Embodiment

The third embodiment is described in detail with reference to FIG. 12 and FIG. 13A to FIG. 13H.

Figure 12:
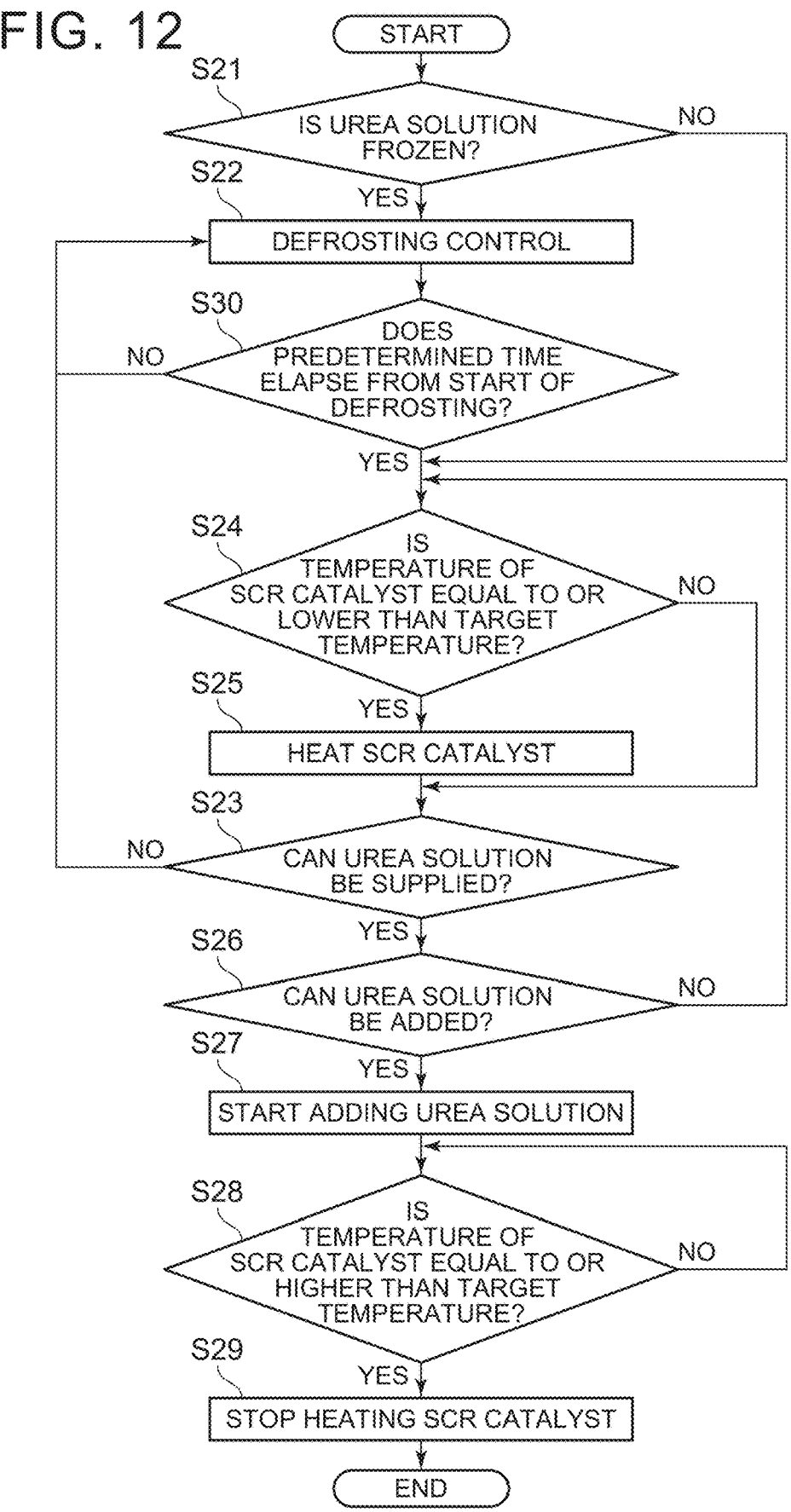
FIG. 12 is a flowchart illustrating a control flow of the third embodiment.

FIG. 12 is a flowchart illustrating a control flow of the third embodiment. In the control flows of the first embodiment and the second embodiment, the heating of the SCR catalyst 20 is started after the urea solution is defrosted. In the control flow of the third embodiment, the heating of the SCR catalyst 20 is started after the defrosting of the urea solution is started and before the urea solution is defrosted. In the third embodiment, the program stored in the memory of the controller 40 is created so that the processor executes each process illustrated in this flowchart. In the flowchart of FIG. 12, the same step numbers are assigned to processes identical to the processes illustrated in the flowchart of FIG. 7 or FIG. 10.

Referring to the flowchart of FIG. 12, determination is first made in Step S21 whether the urea solution is frozen in the urea solution supply device 30. When determination is made that the urea solution is frozen, the defrosting control is executed in Step S22. During the execution of the defrosting control, determination is made in Step S30 whether a predetermined time elapses from the start of defrosting.

The predetermined time for use in the determination in Step S30 corresponds to a time difference between a necessary defrosting time to defrost the frozen urea solution with the defrosting device 35 and a necessary heating time to increase the temperature of the SCR catalyst 20 to the target temperature with the heating device 22. For example, the necessary defrosting time depends on total energy supplied to the defrosting device 35 and a urea solution temperature before the start of defrosting. For example, the necessary heating time depends on total energy supplied to the heating device 22 and an exhaust gas temperature. The memory of the controller 40 stores a map in which the value of the predetermined time is associated with the urea solution temperature and the exhaust gas temperature.

The processes of Step S22 and Step S30 are repeated until the predetermined time elapses from the start of defrosting. When the predetermined time elapses from the start of defrosting, determination is made in Step S24. When determination is made in Step S21 that the urea solution is not frozen, the defrosting control is skipped. In this case, the determination in Step S24 is made immediately.

In Step S24, determination is made whether the temperature of the SCR catalyst 20 is equal to or lower than the target temperature. When the temperature of the SCR catalyst 20 is equal to or lower than the target temperature, the SCR catalyst 20 is heated in Step S25. After the process of Step S25, determination is made in Step S23. When determination is made in Step S24 that the temperature of the SCR catalyst 20 is higher than the target temperature, the heating of the SCR catalyst 20 is skipped. In this case, the determination in Step S23 is made immediately.

In Step S23, the defrosting completion determination process is executed to determine whether the urea solution supply device 30 can supply the urea solution. The processes of Step S22 to Step S23 are repeated until the urea solution can be supplied. When the urea solution can be supplied, determination is made in Step S26.

In Step S26, the temperature determination process is executed to determine whether the urea solution can be added by the urea solution addition valve 32. The processes of Step S24 to Step S26 are repeated until the urea solution can be added. When the urea solution can be added, the urea solution supply start process is executed in Step S27 to start adding the urea solution into exhaust gas from the urea solution addition valve 32.

Next, determination is made in Step S28 whether the temperature of the SCR catalyst 20 is equal to or higher than the target temperature. The determination in Step S28 is repeated until the temperature of the SCR catalyst 20 is equal to or higher than the target temperature. When the temperature of the SCR catalyst 20 is equal to or higher than the target temperature, the heating device 22 stops heating the SCR catalyst 20 in Step S29.

Figure 13:
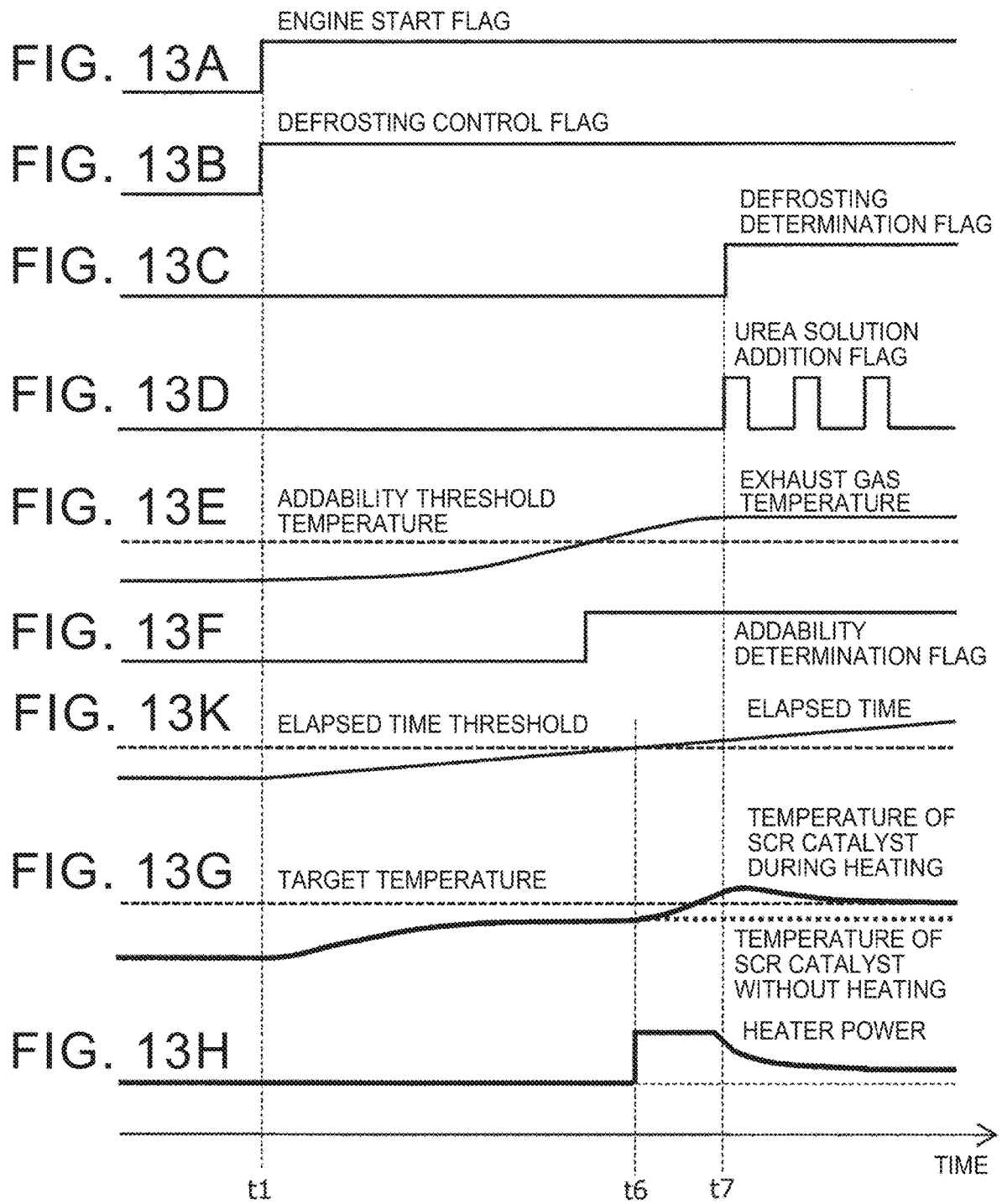
FIG. 13A is a diagram illustrating a control example based on the control flow of the third embodiment.
FIG. 13B is a diagram illustrating the control example based on the control flow of the third embodiment.
FIG. 13C is a diagram illustrating the control example based on the control flow of the third embodiment.
FIG. 13D is a diagram illustrating the control example based on the control flow of the third embodiment.
FIG. 13E is a diagram illustrating the control example based on the control flow of the third embodiment.
FIG. 13F is a diagram illustrating the control example based on the control flow of the third embodiment.
FIG. 13K is a diagram illustrating the control example based on the control flow of the third embodiment.
FIG. 13G is a diagram illustrating the control example based on the control flow of the third embodiment.
FIG. 13H is a diagram illustrating the control example based on the control flow of the third embodiment.

Next, description is given of a control example based on the control flow of the third embodiment. FIG. 13A to FIG. 13K are diagrams illustrating one control example based on the control flow of the third embodiment. In FIG. 13A to FIG. 13K, a time axis is shared. Vertical axes of graphs are identical to the vertical axes of the graphs of FIG. 8A to FIG. 8H, FIG. 9A to FIG. 9H, and FIG. 11A to FIG. 11H. A vertical axis of FIG. 13K represents an elapsed time from the start of the defrosting control. FIG. 13K illustrates an elapsed time threshold. The elapsed time threshold is the predetermined time for use in the determination in Step S30. When the elapsed time exceeds the elapsed time threshold, the result of determination in Step S30 is "Yes".

According to the control example based on the control flow of the third embodiment, the heating device 22 starts heating the SCR catalyst 20 at a time t6 when the elapsed time from the start of the defrosting control exceeds the elapsed time threshold after the defrosting control is executed. Then, addition of the urea solution is started at a time t7 when the exhaust gas temperature is equal to or higher than the addability threshold temperature and the frozen urea solution is defrosted. As compared to the comparative example in which the heating is started at the time t1 when the engine is started (see FIG. 8I and FIG. 8J), it is possible to reduce an unnecessary heating time in a situation in which the urea solution cannot be supplied due to frosting. Therefore, wasteful use of energy can be suppressed. By starting the heating of the SCR catalyst 20 after the defrosting of the urea solution is started and before the urea solution is defrosted, the addition of the urea solution can be started at a timing when the temperature of the SCR catalyst 20 reaches the target temperature.

In this embodiment, the elapsed time from the start of the defrosting control is used to adjust the timing to start heating the SCR catalyst 20, but the heating of the SCR catalyst 20 may be started at a timing when the urea solution temperature is increased to a predetermined temperature. Further, the heating of the SCR catalyst 20 may be started at a timing when the total energy supplied to the defrosting device 35 reaches a predetermined amount.

7. Other Examples of Structure of Exhaust Gas Control Apparatus

Other examples of the structure of the exhaust gas control apparatus are described with reference to FIG. 14 to FIG. 17. In FIG. 14 to FIG. 17, the same reference symbols are used for elements identical or corresponding to those of the exhaust gas control apparatus 10 illustrated in FIG. 1. Redundant description of those elements is omitted hereinafter.

Figure 14:
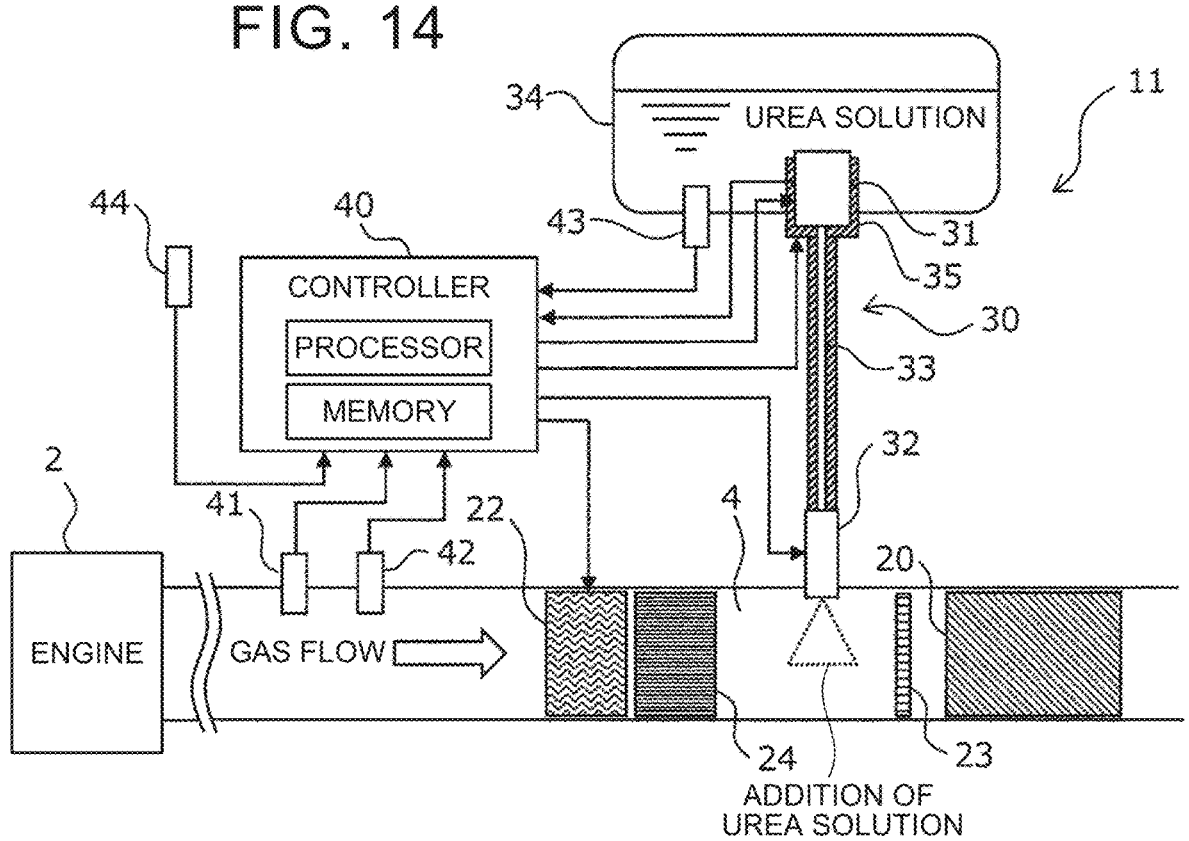
FIG. 14 is a schematic diagram illustrating another example of the structure of the exhaust gas control apparatus according to each embodiment.

In a structure illustrated in FIG. 14, an exhaust gas control apparatus 11 includes an oxidation catalyst 24 on the upstream side of the SCR catalyst 20 and the downstream side of the heating device 22 in the exhaust passage 4. The urea solution addition valve 32 is provided on a downstream side of the oxidation catalyst 24. In this structure, the SCR catalyst 20 may be an SCR filter integrated with a DPF. In this structure, the DPF may be arranged in place of or sided by side with the oxidation catalyst 24.

Figure 15:
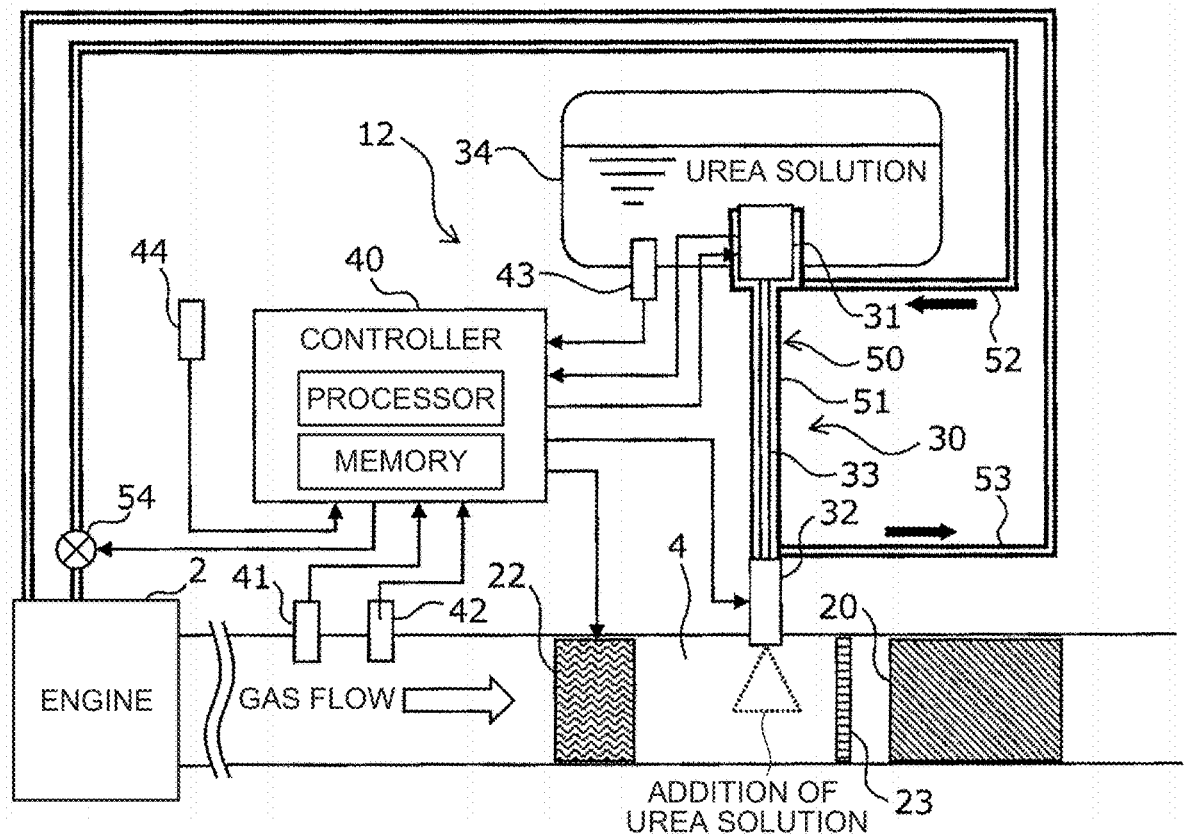
FIG. 15 is a schematic diagram illustrating another example of the structure of the exhaust gas control apparatus according to each embodiment.

In a structure illustrated in FIG. 15, an exhaust gas control apparatus 12 includes a defrosting device 50 in place of the defrosting device 35 that is the electric heater. The defrosting device 50 uses heat of the internal combustion engine 2 for defrosting. The defrosting device 50 includes a water jacket 51, coolant pipes 52 and 53, and a valve 54. The water jacket 51 surrounds the urea solution pump 31 and the urea solution supply pipe 33. The coolant pipes 52 and 53 connect the water jacket 51 and the internal combustion engine 2. The valve 54 is attached to the coolant pipe 52. The controller 40 operates the valve 54 to control supply of a coolant from the internal combustion engine 2 to the water jacket 51. According to this structure, the frozen urea solution is defrosted by a high-temperature coolant heated by the heat generated by the internal combustion engine 2.

Figure 16:
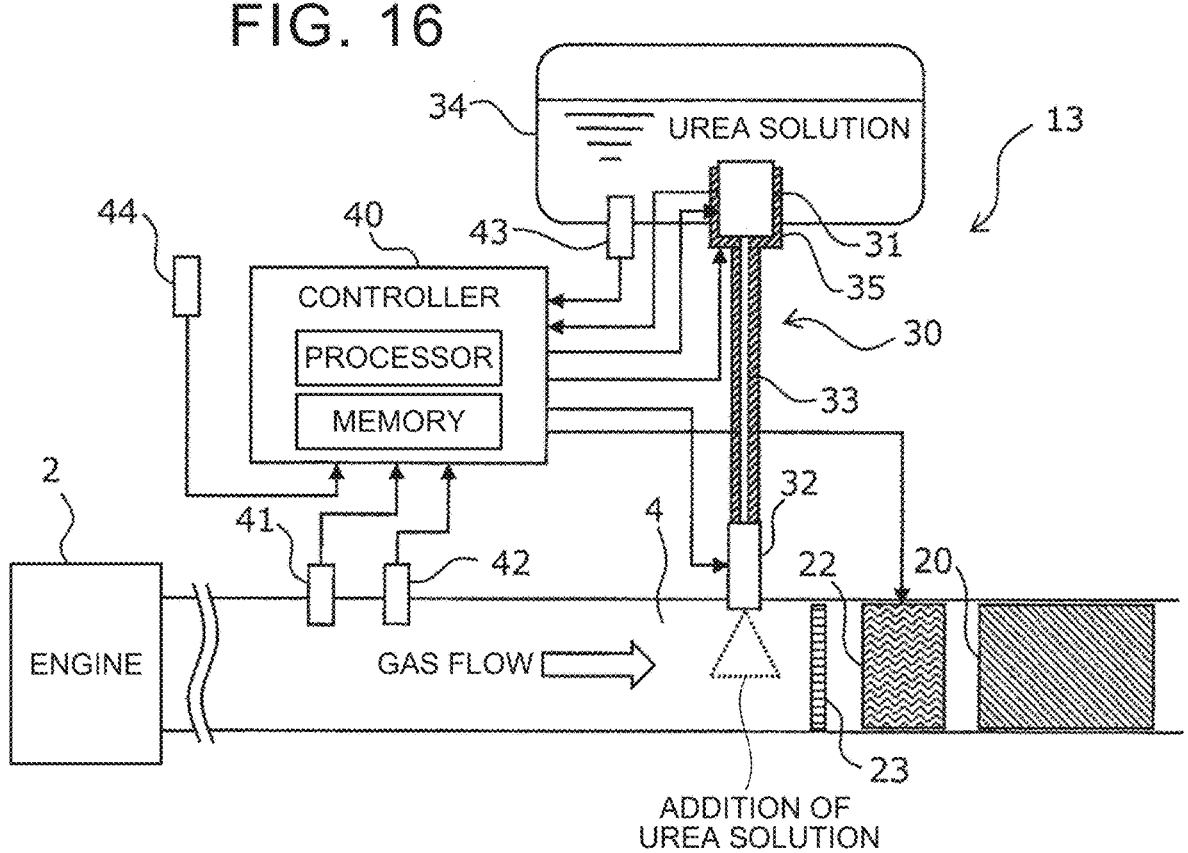
FIG. 16 is a schematic diagram illustrating another example of the structure of the exhaust gas control apparatus according to each embodiment.
Figure 17:
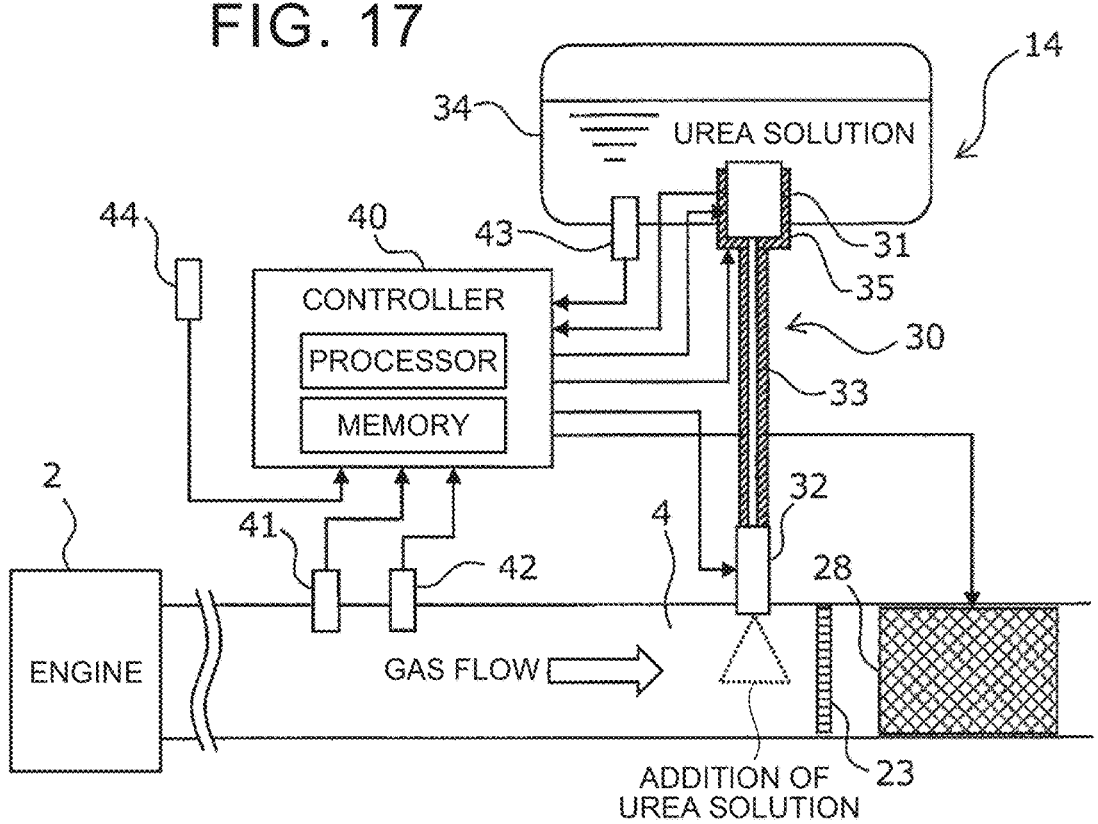
FIG. 17 is a schematic diagram illustrating another example of the structure of the exhaust gas control apparatus according to each embodiment.

In a structure illustrated in FIG. 16, an exhaust gas control apparatus 13 includes the heating device 22 between the mixer 23 and the SCR catalyst 20. The urea solution addition valve 32 adds the urea solution to exhaust gas on an upstream side of a portion heated by the heating device 22 in the exhaust passage 4. A structure illustrated in FIG. 17 is a modified example of the structure illustrated in FIG. 16. An exhaust gas control apparatus 14 includes a heating catalyst 28 obtained by integrating the SCR catalyst 20 and the heating device 22 in the structure illustrated in FIG. 16. Unlike the other structures, the heat of the heating device cannot be used for hydrolyzing the urea solution in the structures illustrated in FIG. 16 and FIG. 17.

The structures illustrated in FIG. 14 to FIG. 17 can be used as preconditions for the first to third embodiments.

8. Overview of Fourth and Fifth Embodiments

Fourth and fifth embodiments have a common technical idea as a subordinate concept that is included in the technical idea described above as the superordinate concept. In the fourth and fifth embodiments, the predetermined state in which ammonia cannot be adsorbed on the SCR catalyst 20 is the second state, that is, the state in which the urea solution supplied from the urea solution supply device 30 to the exhaust passage 4 is not hydrolyzed. In the fourth and fifth embodiments, the structure illustrated in FIG. 16 or FIG. 17 is used as a precondition. An overview of the fourth and fifth embodiments is described taking the exemplary exhaust gas control apparatus 13 in the structure illustrated in FIG. 16.

In the structure illustrated in FIG. 16, the heat of the heating device 22 cannot be used for hydrolyzing the urea solution added to exhaust gas. In a case of a cold start of the internal combustion engine 2, the urea solution added to the exhaust gas is not hydrolyzed, but urea precipitates and is deposited in the exhaust passage 4 though the urea solution addition valve 32 is operated. Ammonia cannot be produced in a situation in which the urea solution is not hydrolyzed. Therefore, energy is wasted even if the heating device 22 heats the SCR catalyst 20.

When the temperature at a predetermined position in the exhaust passage 4 is lower than a threshold temperature, wasteful use of energy is suppressed by executing the heating avoidance process. For example, the predetermined position may be a position where the urea solution is added to exhaust gas by the urea solution addition valve 32, a position where the urea solution and the exhaust gas are mixed by the mixer 23, or a position where the exhaust gas temperature is measured by the exhaust gas temperature sensor 41. The threshold temperature is associated with the hydrolysis temperature of the urea solution. Specifically, the threshold temperature is set so that, when the temperature at the predetermined position is the threshold temperature, the temperature on a downstream side of the position where the urea solution is added by the urea solution addition valve 32, for example, the temperature at the position where the urea solution and the exhaust gas are mixed by the mixer 23 is the hydrolysis temperature of the urea solution.

When the exhaust gas temperature is increased by warming up the internal combustion engine 2, the urea solution can be hydrolyzed by heat of exhaust gas. When the urea solution is hydrolyzed to produce ammonia, the heating of the SCR catalyst 20 with the heating device 22 is effective. The heating avoidance process is terminated under a necessary condition that the exhaust gas temperature is increased. Thus, the heating device 22 can start heating the SCR catalyst 20.

Figure 18:
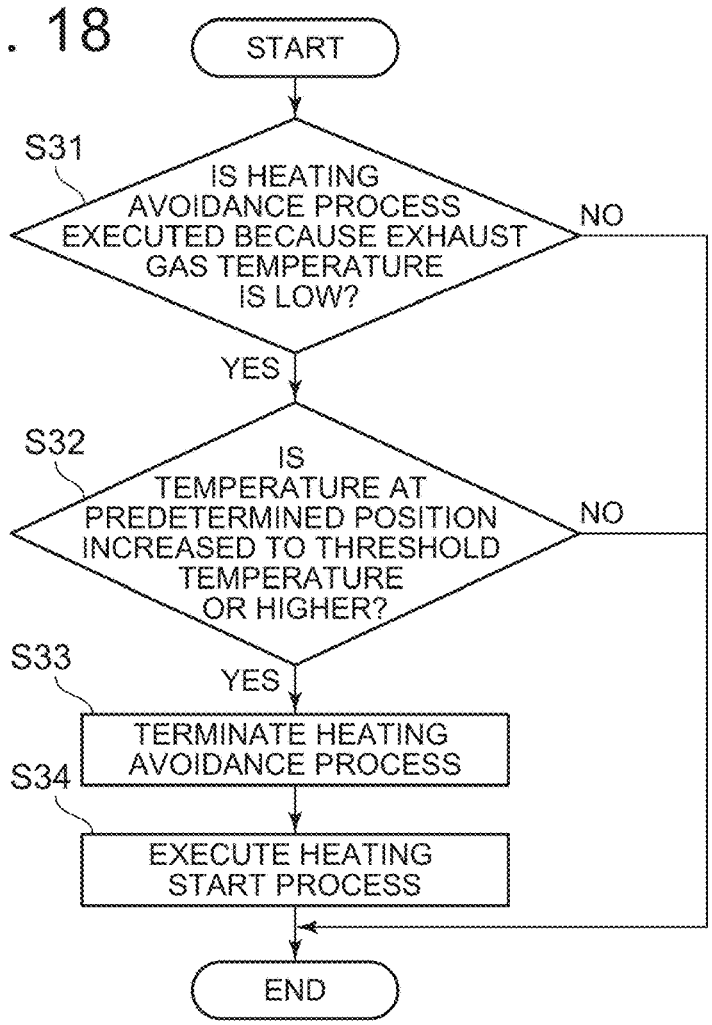
FIG. 18 is an explanatory drawing of an overview of fourth and fifth embodiments.

FIG. 18 is a flowchart illustrating a control flow that represents the technical idea common to the fourth and fifth embodiments. In the fourth and fifth embodiments, the program stored in the memory of the controller 40 is created so that the processor executes a process that embodies the technical idea represented by this control flow.

Referring to the flowchart of FIG. 18, determination is first made in Step S31 whether the heating avoidance process is executed because the exhaust gas temperature is low. For example, in a case of a cold start of the internal combustion engine 2, the result of determination is "Yes". When the heating avoidance process is executed because ammonia cannot be produced due to a low exhaust gas temperature, determination is made in Step S32 whether the temperature at the predetermined position in the exhaust passage 4 is equal to or higher than the threshold temperature. When the result of determination changes from "No" to "Yes" because the exhaust gas temperature is increased, the heating avoidance process is terminated in Step S33, and the heating start process is executed in Step S34 to start heating the SCR catalyst 20 with the heating device 22. By executing those processes, wasteful use of energy due to unnecessary heating of the SCR catalyst 20 can be suppressed in a situation in which ammonia cannot be produced from the urea solution due to a low temperature.

9. Details of Fourth Embodiment

Figure 19:
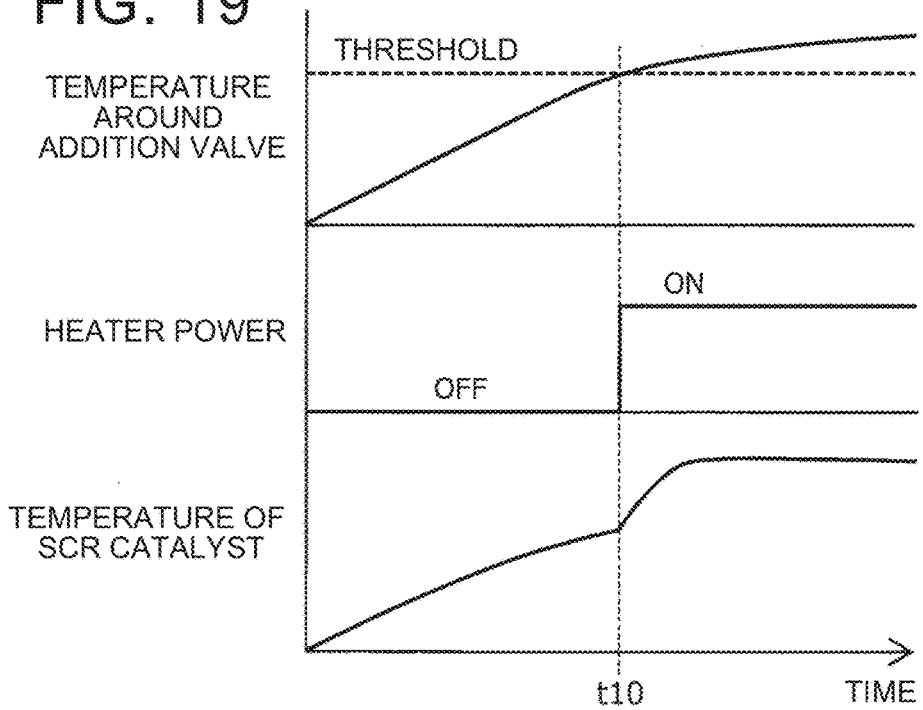
FIG. 19 is an explanatory drawing of details of control of the fourth embodiment.

The fourth embodiment is described in detail with reference to FIG. 19. In the fourth embodiment, the exhaust gas control apparatus 13 in the structure illustrated in FIG. 16 is used as a precondition. FIG. 19 is an explanatory drawing of details of control of the fourth embodiment. In FIG. 19, graphs having a common time axis show a change in a temperature around the urea solution addition valve 32, an ON/OFF change in the heater power of the heating device 22, and a change in the temperature of the SCR catalyst 20 from a time immediately after a cold start of the internal combustion engine 2. The temperature around the urea solution addition valve 32 means the temperature at the predetermined position described above.

As illustrated in FIG. 19, the heater power of the heating device 22 is OFF through the heating avoidance process immediately after the cold start of the internal combustion engine 2. After the cold start of the internal combustion engine 2, the exhaust gas temperature is increased gradually, and the temperature around the urea solution addition valve 32 is equal to or higher than the threshold temperature at a time t10. In response to this, the heating avoidance process is terminated, and the heating start process is executed. That is, the heater power of the heating device 22 is switched from OFF to ON, and the heating device 22 starts heating the SCR catalyst 20. When the temperature of the SCR catalyst 20 is increased to the active temperature by heating, the urea solution supply start process is executed to start adding the urea solution by the urea solution addition valve 32.

10. Details of Fifth Embodiment

Figure 20:
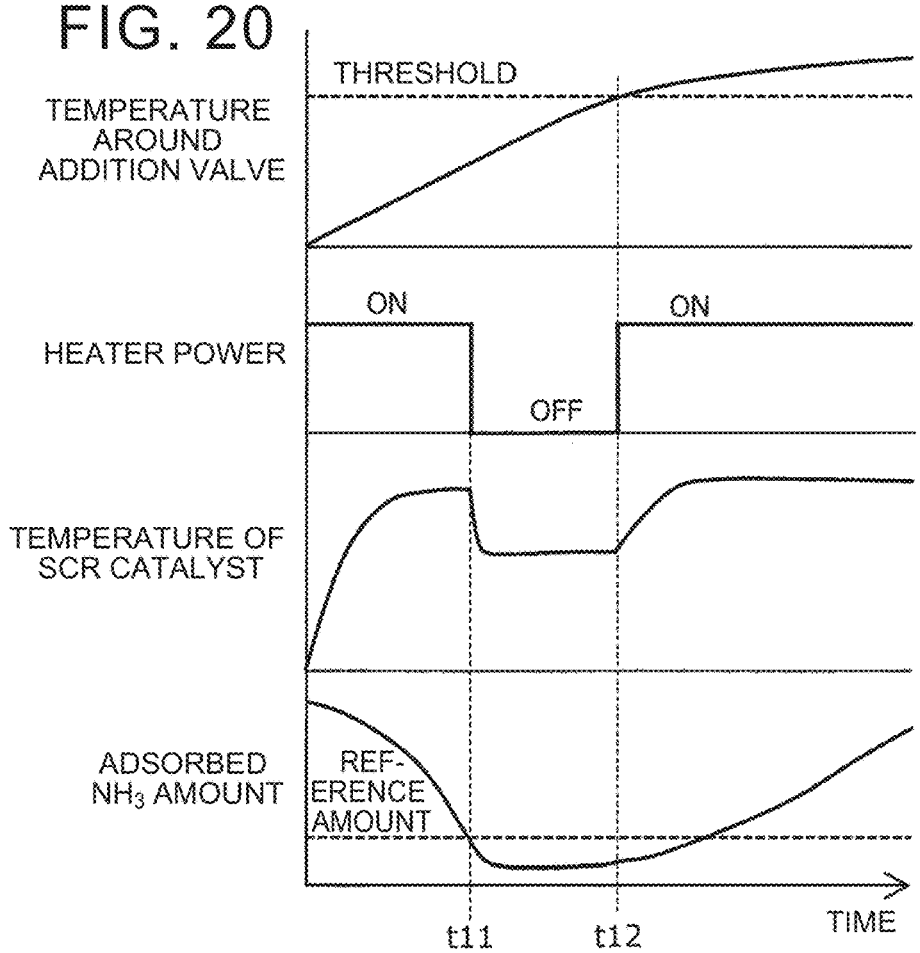
FIG. 20 is an explanatory drawing of details of control of the fifth embodiment.

The fifth embodiment is described in detail with reference to FIG. 20. In the fifth embodiment, the exhaust gas control apparatus 13 in the structure illustrated in FIG. 16 is used as a precondition. FIG. 20 is an explanatory drawing of details of control of the fifth embodiment. In FIG. 20, graphs having a common time axis show a change in the temperature around the urea solution addition valve 32, an ON/OFF change in the heater power of the heating device 22, a change in the temperature of the SCR catalyst 20, and a change in the adsorbed ammonia amount of the SCR catalyst 20 from a time immediately after a cold start of the internal combustion engine 2.

The fifth embodiment has a feature in that the amount of ammonia adsorbed on the SCR catalyst 20 is used for determining whether to heat the SCR catalyst 20 with the heating device 22. According to the fourth embodiment, the heating of the SCR catalyst 20 with the heating device 22 is avoided in a situation in which ammonia cannot be produced from the added urea solution. When a predetermined amount of ammonia or more is adsorbed on the SCR catalyst 20, $NO_x$ can be removed by using adsorbed ammonia while heating the SCR catalyst 20 with the heating device 22.

In the example illustrated in FIG. 20, the adsorbed ammonia amount of the SCR catalyst 20 exceeds a reference amount immediately after the cold start of the internal combustion engine 2. The reference amount is a sufficient adsorbed ammonia amount to remove $NO_x$, and is determined based on results of test or simulation. For example, the adsorbed ammonia amount can be estimated based on an operation history of the internal combustion engine 2. Immediately after the cold start of the internal combustion engine 2, the exhaust gas temperature is low, and the temperature around the urea solution addition valve 32 is lower than the threshold temperature. In the fifth embodiment, while ammonia is adsorbed on the SCR catalyst 20 in an amount equal to or larger than the reference amount, the heating avoidance process is not executed, and the heater power of the heating device 22 is ON though the temperature around the urea solution addition valve 32 is lower than the threshold temperature.

The adsorbed ammonia amount of the SCR catalyst 20 gradually decreases because ammonia is not supplied from the upstream side. At a time t11 when the adsorbed ammonia amount is smaller than the reference amount, the heater power of the heating device 22 is temporarily switched from ON to OFF, and the heating avoidance process is executed.

Along with an increase in the exhaust gas temperature, the temperature around the urea solution addition valve 32 is equal to or higher than the threshold temperature. In response to this, the heating avoidance process is terminated, and the heating start process is executed. That is, the heater power of the heating device 22 is switched from OFF to ON again, and the heating device 22 resumes heating the SCR catalyst 20. When the temperature of the SCR catalyst 20 is increased to the active temperature by heating, the urea solution addition valve 32 starts adding the urea solution.

11. Classification of Abnormality of Exhaust Gas Control Apparatus and Technical Idea of Sixth Embodiment Among the predetermined states in which ammonia cannot be adsorbed on the SCR catalyst 20, the first state, that is, the state in which a urea solution necessary to produce ammonia cannot be supplied may be caused by an abnormality of the exhaust gas control apparatus. The third state, that is, the state in which ammonia can be produced but the SCR catalyst 20 cannot adsorb ammonia may also be caused by the abnormality of the exhaust gas control apparatus.

Figure 21:
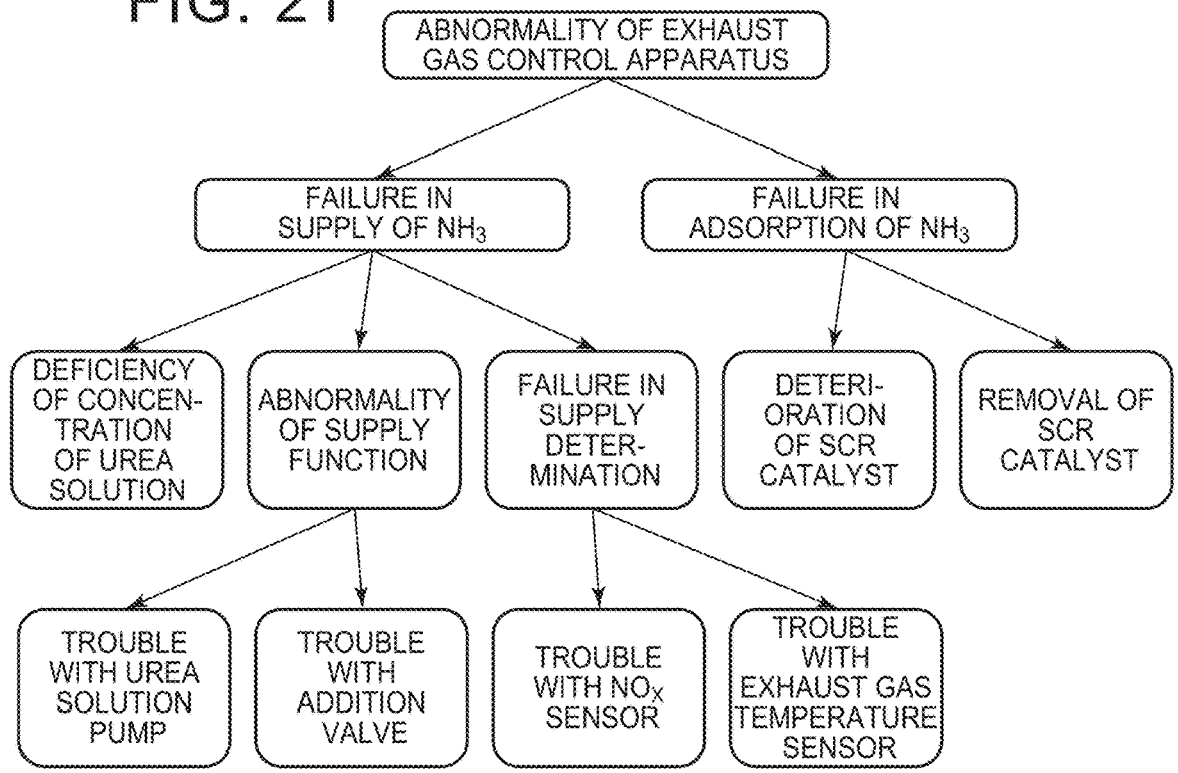
FIG. 21 is an explanatory drawing of classification of an abnormality of the exhaust gas control apparatus.

FIG. 21 is a diagram illustrating classification of the abnormality of the exhaust gas control apparatus based on its symptom. As illustrated in FIG. 21, the symptom of the abnormality of the exhaust gas control apparatus can be classified into failure in supply of ammonia and failure in adsorption of ammonia. Causes of the failure in supply of ammonia include three causes that are deficiency of the concentration of the urea solution, an abnormality of the supply function, and failure in supply determination. More specifically, the abnormality of the supply function is trouble with the urea solution pump or trouble with the urea solution addition valve. More specifically, the failure in supply determination is trouble with the $NO_x$ sensor or trouble with the exhaust gas temperature sensor. Causes of the failure in adsorption of ammonia include two causes that are deterioration of the SCR catalyst and removal of the SCR catalyst from the exhaust passage. For example, those abnormalities may directly be detected based on signals from the sensors of the exhaust gas control apparatus, or may be detected by self-diagnosis based on information acquired by one or more sensors.

12. Overview of Sixth Embodiment

The sixth embodiment has a technical idea as a subordinate concept that is included in the technical idea described above as the superordinate concept. In the sixth embodiment, the predetermined state in which ammonia cannot be adsorbed on the SCR catalyst 20 is the first or third state caused by the abnormality of the exhaust gas control apparatus. When a urea solution necessary to produce ammonia cannot be supplied due to the abnormality of the exhaust gas control apparatus, the heating avoidance process is continued until the abnormality is eliminated, and the heating avoidance process is terminated when the abnormality is eliminated. Thus, wasteful use of energy due to an unnecessary operation of the heating device can be prevented in a state in which an abnormality occurs in the exhaust gas control apparatus.

Figure 22:
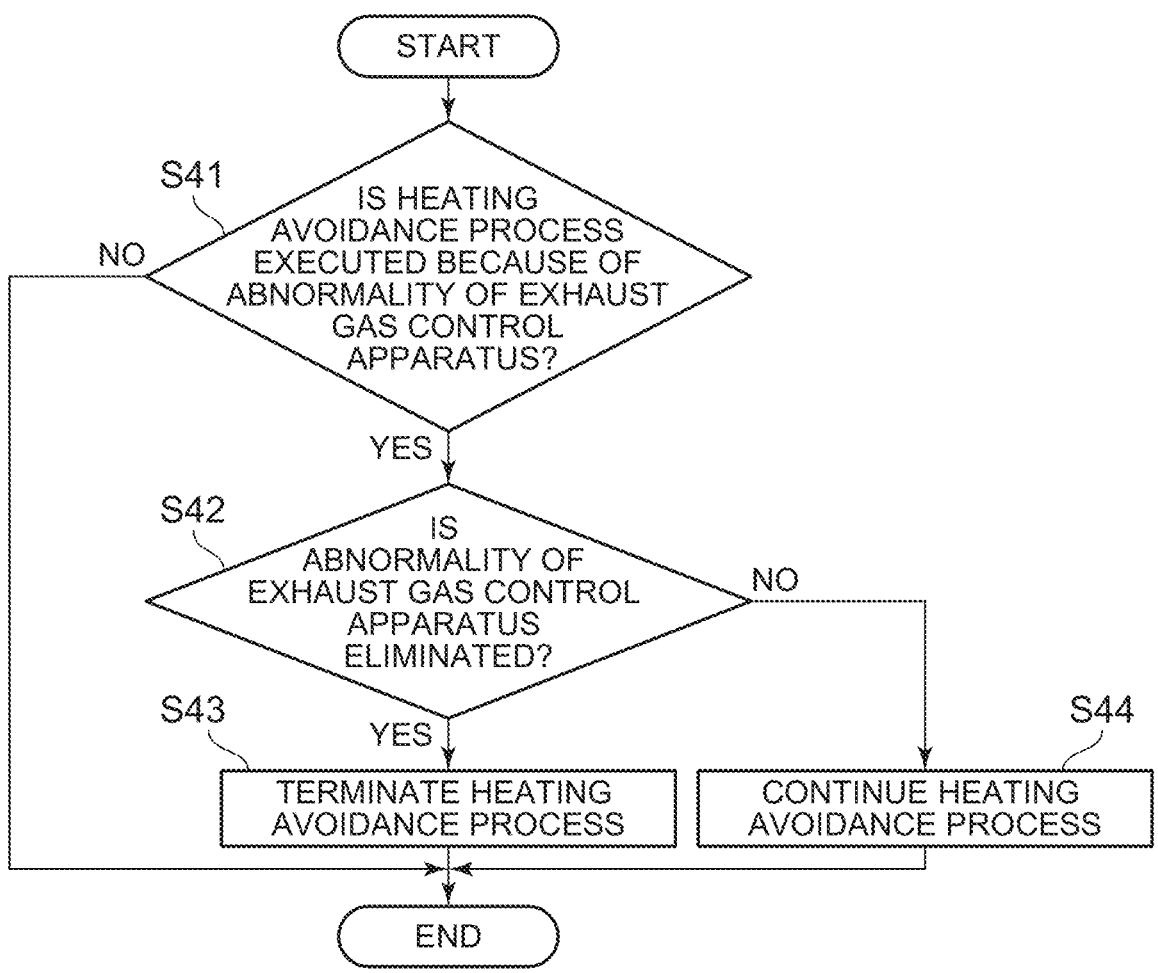
FIG. 22 is an explanatory drawing of an overview of a sixth embodiment.

FIG. 22 is a flowchart illustrating a control flow that represents the technical idea of the sixth embodiment. In the sixth embodiment, the program stored in the memory of the controller is created so that the processor executes a process that embodies the technical idea represented by this control flow. The structure of the exhaust gas control apparatus serving as a precondition for the sixth embodiment may be any one of the structures illustrated in FIG. 1, FIG. 14, FIG. 15, FIG. 16, and FIG. 17. An overview of the sixth embodiment is described taking the exemplary exhaust gas control apparatus 10 in the structure illustrated in FIG. 1.

Referring to the flowchart of FIG. 22, determination is first made in Step S41 whether the heating avoidance process is executed because of an abnormality of the exhaust gas control apparatus 10. When the heating avoidance process is executed because of the abnormality of the exhaust gas control apparatus 10, determination is made in Step S42 whether the abnormality of the exhaust gas control apparatus 10 is eliminated. When the abnormality of the exhaust gas control apparatus 10 is eliminated, the heating avoidance process is terminated in Step S43. When the abnormality of the exhaust gas control apparatus 10 is not eliminated, the heating avoidance process is continued in Step S44. Wasteful use of energy due to unnecessary heating of the SCR catalyst 20 can be suppressed in a situation in which an abnormality occurs in the exhaust gas control apparatus 10.

13. Other Embodiments

In the embodiments described above, determination is made on a current state of the exhaust gas control apparatus based on information acquired by the sensors. For example, in a case of a cold start of the internal combustion engine, there is a high probability that the exhaust gas control apparatus is currently in the predetermined state in which ammonia cannot be adsorbed on the SCR catalyst even though the information from the sensors is not used. In this case, the heating avoidance process may be executed to avoid heating the SCR catalyst with the heating device irrespective of the operating condition of the internal combustion engine.

The disclosure described above can attain a technical idea: "in the exhaust gas control apparatus including the SCR catalyst arranged in the exhaust passage of the internal combustion engine, the heating device configured to heat the SCR catalyst directly or indirectly, the urea solution supply device configured to supply the urea solution to the upstream side of the SCR catalyst in the exhaust passage, and the controller configured to operate the heating device and the urea solution supply device, the controller executes the heating avoidance process for avoiding heating the SCR catalyst with the heating device irrespective of the operating condition of the internal combustion engine when the exhaust gas control apparatus is currently in the predetermined state in which ammonia cannot be adsorbed on the SCR catalyst."

What is claimed is:

1. An exhaust gas control apparatus for an internal combustion engine, comprising:
  a selective catalytic reduction catalyst arranged in an exhaust passage of the internal combustion engine;
  a heating device configured to heat the selective catalytic reduction catalyst directly or indirectly, wherein the heating device is positioned to receive exhaust from the internal combustion engine regardless of a temperature in the exhaust passage;
  a urea solution supply device configured to supply a urea solution to an upstream side of the selective catalytic reduction catalyst in the exhaust passage;
  a controller configured to operate the heating device and the urea solution supply device;
  at least one sensor configured to acquire information related to a state of the exhaust gas control apparatus,
  wherein the controller is configured to execute:
    a state determination process for determining whether the exhaust gas control apparatus is currently in a predetermined state in which ammonia is not adsorbable on the selective catalytic reduction catalyst based on the information from the at least one sensor; and
    a heating avoidance process for avoiding heating the selective catalytic reduction catalyst with the heating device irrespective of an operating condition of the internal combustion engine when the exhaust gas control apparatus is currently in the predetermined state; and
  a defrosting device configured to defrost the urea solution when the urea solution is frozen in the urea solution supply device,
  wherein the controller is configured to execute, when the predetermined state is caused because the urea solution is frozen in the urea solution supply device:
    a defrosting start process for starting defrosting the urea solution with the defrosting device; and
    a heating start process for starting heating the selective catalytic reduction catalyst with the heating device by terminating the heating avoidance process after the defrosting start process is executed.
2. The exhaust gas control apparatus according to claim 1, wherein the controller is configured to execute:

a defrosting completion determination process for determining whether the defrosting device completes defrosting the urea solution after the defrosting start process is executed; and a urea solution supply start process for starting supplying the urea solution by the urea solution supply device after the heating start process is executed and after the defrosting device completes defrosting the urea solution.

3. The exhaust gas control apparatus according to claim 2, wherein the controller is configured to execute the heating start process after the defrosting device completes defrosting the urea solution.

4. The exhaust gas control apparatus according to claim 2, wherein the controller is configured to execute the heating start process before the defrosting device completes defrosting the urea solution.

5. The exhaust gas control apparatus according to claim 2, wherein the controller is configured to execute:
a temperature determination process for determining whether a temperature at a predetermined position in the exhaust passage is increased to a threshold temperature or higher; and
the urea solution supply start process after the temperature at the predetermined position is increased to the threshold temperature or higher.

6. The exhaust gas control apparatus according to claim 1, wherein the controller is configured to execute:
a defrosting completion determination process for determining whether the defrosting device completes defrosting the urea solution after the defrosting start process is executed;
a urea solution supply start process for starting supplying the urea solution by the urea solution supply device after the defrosting device completes defrosting the urea solution; and
the heating start process after the urea solution supply start process is executed.

7. The exhaust gas control apparatus according to claim 6, wherein the controller is configured to execute:
a temperature determination process for determining whether a temperature at a predetermined position in the exhaust passage is increased to a threshold temperature or higher; and
the urea solution supply start process after the temperature at the predetermined position is increased to the threshold temperature or higher.

8. The exhaust gas control apparatus according to claim 1, wherein the controller is configured such that, when the predetermined state is caused by an abnormality of the exhaust gas control apparatus, the heating avoidance process is continued until the abnormality of the exhaust gas control apparatus is eliminated.

9. An exhaust gas control apparatus for an internal combustion engine, comprising:
a selective catalytic reduction catalyst arranged in an exhaust passage of the internal combustion engine;
a heating device configured to heat the selective catalytic reduction catalyst directly or indirectly, wherein the heating device is positioned to receive exhaust from the internal combustion engine regardless of a temperature in the exhaust passage;
a urea solution supply device configured to supply a urea solution to an upstream side of the selective catalytic reduction catalyst in the exhaust passage;
a controller configured to operate the heating device and the urea solution supply device;

at least one sensor configured to acquire information related to a state of the exhaust gas control apparatus, wherein the controller is configured to execute:
a state determination process for determining whether the exhaust gas control apparatus is currently in a predetermined state in which ammonia is not adsorbable on the selective catalytic reduction catalyst based on the information from the at least one sensor; and
a heating avoidance process for avoiding heating the selective catalytic reduction catalyst with the heating device irrespective of an operating condition of the internal combustion engine when the exhaust gas control apparatus is currently in the predetermined state, wherein
the urea solution supply device is configured to supply the urea solution to an upstream side of a portion heated by the heating device in the exhaust passage, and
the controller is configured such that, when the predetermined state is caused because the urea solution supplied from the urea solution supply device to the exhaust passage is not hydrolyzed, the heating avoidance process is terminated and the heating device starts heating the selective catalytic reduction catalyst after a temperature at a predetermined position in the exhaust passage is increased to a threshold temperature or higher.

10. The exhaust gas control apparatus according to claim 9, further comprising a defrosting device configured to defrost the urea solution when the urea solution is frozen in the urea solution supply device,
wherein the controller is configured to execute, when the predetermined state is caused because the urea solution is frozen in the urea solution supply device:
a defrosting start process for starting defrosting the urea solution with the defrosting device; and
a heating start process for starting heating the selective catalytic reduction catalyst with the heating device by terminating the heating avoidance process after the defrosting start process is executed.

11. The exhaust gas control apparatus according to claim 9, wherein the controller is configured to:
avoid, while ammonia is adsorbed on the selective catalytic reduction catalyst in an amount equal to or larger than a reference amount, executing the heating avoidance process though the temperature at the predetermined position is lower than the threshold temperature; and
execute the heating avoidance process after an adsorption amount of ammonia on the selective catalytic reduction catalyst is smaller than the reference amount.

12. An exhaust gas control apparatus, comprising:
a selective catalytic reduction (SCR) catalyst in an exhaust passage for an internal combustion engine;
a heating device configured to heat the SCR catalyst;
a urea solution supply device configured to supply a urea solution from a urea supply to the exhaust passage upstream of the SCR catalyst;
a first sensor configured to detect a temperature of the urea supply;
a second sensor configured to detect a temperature of the exhaust passage at a position between the SCR catalyst and the urea supply device; and
a controller configured to operate the heating device and the urea solution supply device, wherein the controller is configured to:

determine whether a predetermined state exists in the exhaust passage, wherein the controller is configured to determine that the predetermined state exists in response to:
- a determination that the urea solution in the urea supply is frozen based on data from the first sensor,
- a determination that the urea solution in the urea supply is not frozen based on the data from the first sensor, and a determination that the temperature at the position is below a hydrolysis temperature of the urea solution to produce ammonia based on data from the second sensor, or
- a determination that the urea solution in the urea supply is not frozen based on the data from the first sensor and that the temperature at the position is at or above the hydrolysis temperature of the urea solution, and a determination that the SCR catalyst cannot adsorb ammonia, and avoid heating the SCR catalyst with the heating device irrespective of an operating condition of the internal combustion engine when in response to a determination that the predetermined state exists.

\* \* \* \* \*